US012728919B2

(12) United States Patent
Ponstein

(10) Patent No.: US 12,728,919 B2
(45) Date of Patent: Sep. 8, 2026

(54) GROUND MILLING MACHINE, IN PARTICULAR ROAD MILLING MACHINE, STABILIZER OR RECYCLER, METHOD FOR MOVING A GROUND MILLING MACHINE IN A DIRECTION UP TO 90° TRANSVERSE TO A LONGITUDINAL MACHINE DIRECTION AND METHOD FOR POSITIONING A GROUND MILLING MACHINE FOR MAINTENANCE WORKS AND/OR FOR TRANSPORT

(71) Applicant: BOMAG GMBH, Boppard (DE)

(72) Inventor: Joachim Ponstein, Boppard (DE)

(73) Assignee: BOMAG GmbH, Boppard (DE)

( * ) Notice: Subject to any disclaimer, the term of this patent is extended or adjusted under 35 U.S.C. 154(b) by 385 days.

(21) Appl. No.: 18/504,597

(22) Filed: Nov. 8, 2023

(65) Prior Publication Data

US 2024/0149962 A1 May 9, 2024

(30) Foreign Application Priority Data

Nov. 8, 2022 (DE) ..................... 10 2022 211 804.9
Mar. 29, 2023 (EP) .................................... 23165258

(51) Int. Cl.
*B62D 11/20* (2006.01)
*B62D 7/02* (2006.01)
*E01C 23/088* (2006.01)

(52) U.S. Cl.
CPC .............. *B62D 11/20* (2013.01); *B62D 7/026* (2013.01); *B60G 2500/30* (2013.01); *E01C 23/088* (2013.01)

(58) Field of Classification Search
CPC ..................................................... B62D 11/20
(Continued)

(56) References Cited

U.S. PATENT DOCUMENTS 6,173,512 B1 * 1/2001 Bitelli .................. E01C 23/088 404/90
6,286,615 B1 * 9/2001 Bitelli ..................... B62D 7/04 180/9.46

(Continued)

FOREIGN PATENT DOCUMENTS

DE 29924566 1/2004
DE 102015007937 7/2016

(Continued)

*Primary Examiner* — Kevin Hurley
(74) *Attorney, Agent, or Firm* — Secant IP, PLLC

(57) ABSTRACT

A ground milling machine, in particular a road milling machine or stabilizer or recycler, having a machine frame and at least one front travel unit as viewed in a longitudinal machine direction and at least one rear travel unit as viewed in the longitudinal machine direction, each travel unit comprising a respective travel wheel, which is in contact with an underlying ground during travel operation of the ground milling machine and has a wheel tread configured for direct ground contact, or a crawler track, which is in contact with an underlying ground during travel operation of the ground milling machine, and a drive wheel configured for driving the crawler track, at least one travel unit being height-adjustable along a lifting axis via a lifting device and/or being rotatable about a steering axis for steering the ground milling machine, and the at least one travel unit being arranged on the machine frame via a mounting device, said mounting device being configured such that the travel unit can be moved at least partially transversely to the lifting axis and/or steering axis through a translational movement.

21 Claims, 9 Drawing Sheets

(58) Field of Classification Search
USPC .......................................................... 180/209
See application file for complete search history.

(56) References Cited

U.S. PATENT DOCUMENTS

| | | | | |
|---|---|---|---|---|
| 6,481,924 | B1 * | 11/2002 | Smolders ................ | E01C 19/42 180/408 |
| 9,068,303 | B2 * | 6/2015 | Berning ................ | E01C 23/127 |
| 9,908,571 | B2 * | 3/2018 | Guntert, Jr. ............. | E01C 19/42 |
| 12,012,701 | B2 * | 6/2024 | Ponstein ............... | E01C 23/127 |
| 2016/0040372 | A1 | 2/2016 | Eiden | |

FOREIGN PATENT DOCUMENTS

| | | |
|---|---|---|
| DE | 102016008998 | 1/2018 |
| EP | 2076419 | 11/2018 |
| EP | 2230160 | 9/2019 |

* cited by examiner 1
5
3
2
4
27
L
11
11
12a
12b
8
6
10
9
7
6
H/K
H/K 1
2
27
3
L
4
11
11
12a
12b
8
H/K
6
10
9
7
H/K
6

12a
6
3
1
9
12b
6
11
11
LF
M
H/K
H/K
H/K
12a
H/K
12b
5
Q
11
6
L
11
6

LF 6
3
1
9
6
12a
12b
M
11
11
H/K
H/K
H/K
H/K
11
11
5
Q
12a
L
6
6
12b

H/K
11
12
23
14
13
15
16
17
P
6
R1
22
13
19
16
LF

H/K
12
11
23
14
29
13
6
24
R4
V

H/K
12
11
23
14
13
29
24
6
V
A4
R4

12
6
20
R2
23
11
14
A2
P
H/K
19
A1
R1
V 12
6
20
R2
11
A2
14
A3
H/K
23
P
19
A1
R1
V 12
6
20
R2
23
14
A2
28
K
P
A3
11
H
19
A1
R1
V 12
6
20
R2
23
A2
P
14
28
K
H
A3
11
A1
19
V
R1

H/K
11
23
12
25
13
26
14
P
6
22
19
R2
21
21
LF
R1
20
R3
R3
A2
A1
V

H/K
11
23
V
14
P
13
22
19
R2
12
21
21
6
20
R3
R3
R1
A2
A1
A3

H/K
11
23
12
V
P
14
6
22
R2
19
21
21
R1
20
R3
R3
A2
A1
A3

Fig. 21
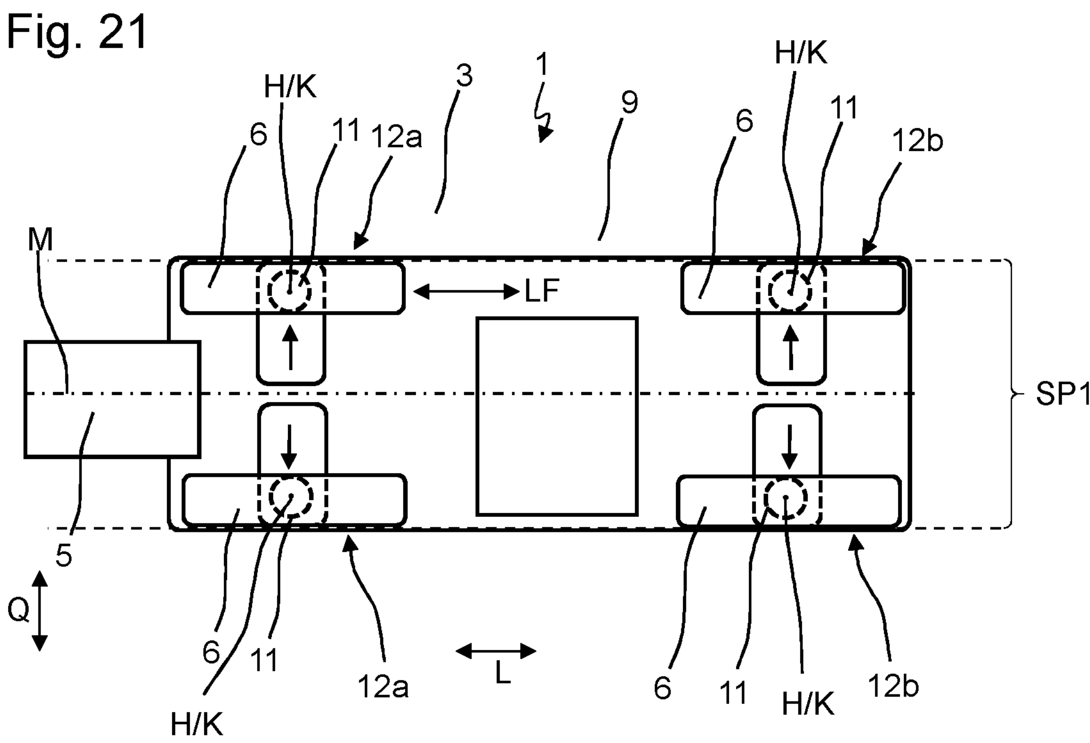
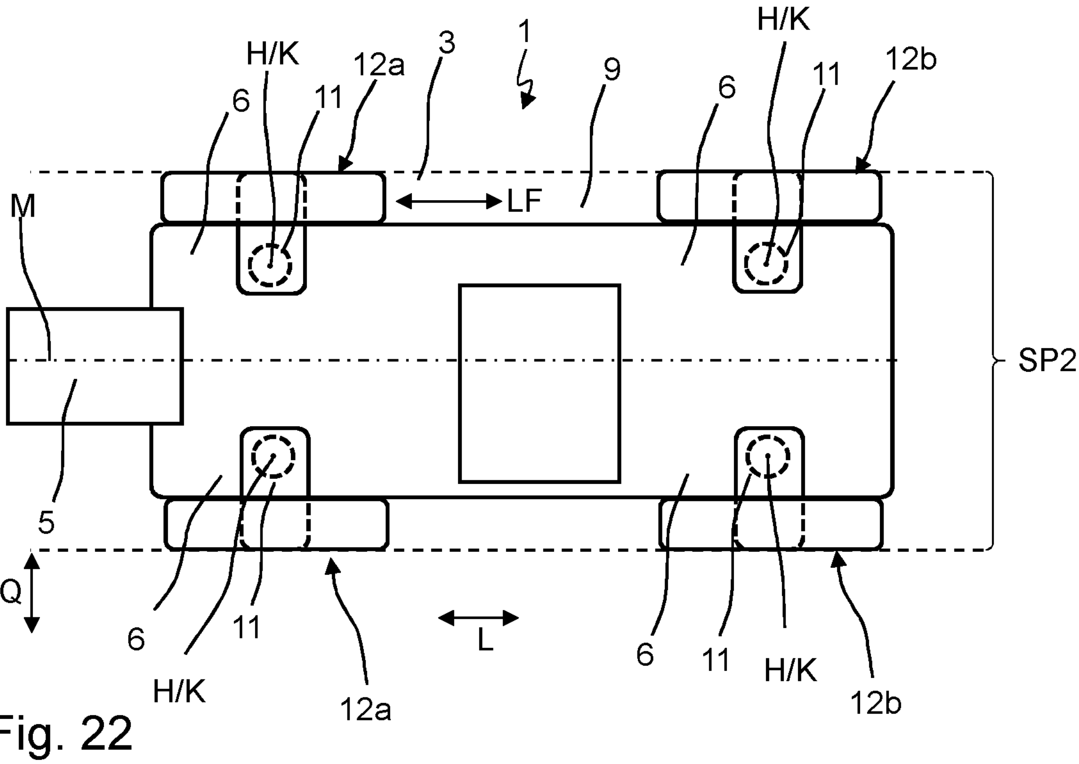
Fig. 22

Fig. 23

GROUND MILLING MACHINE, IN PARTICULAR ROAD MILLING MACHINE, STABILIZER OR RECYCLER, METHOD FOR MOVING A GROUND MILLING MACHINE IN A DIRECTION UP TO 90° TRANSVERSE TO A LONGITUDINAL MACHINE DIRECTION AND METHOD FOR POSITIONING A GROUND MILLING MACHINE FOR MAINTENANCE WORKS AND/OR FOR TRANSPORT

FIELD

The invention relates to a ground milling machine, in particular a road milling machine or a stabilizer or a recycler, with a machine frame and at least one front travel unit as seen in a longitudinal machine direction and at least one rear travel unit as seen in the longitudinal machine direction. Moreover, the invention relates to a method for moving a ground milling machine in a direction up to 90° transverse to a longitudinal machine direction and a method for positioning a ground milling machine for maintenance works and/or for transport.

BACKGROUND

Generic ground milling machines are used in particular in road and pathway construction as well as construction of public squares and take-off and landing runways. They are typically self-propelled construction machines that have a machine frame supported by a travel mechanism. In addition, they typically have an operator platform where an operator can be located and from which the operator controls the ground milling machine, for example via a control device. A milling drum is typically provided as the central working device of a ground milling machine. Said milling drum is usually a hollow cylinder having an outer surface on which a plurality of milling tools, such as milling chisels, is arranged. The milling drum is typically mounted for rotation about a rotation axis in a milling drum box. The milling drum box surrounds the milling drum in a hood-like manner and is open at the bottom, i.e., toward the ground. The rotation of the milling drum drives the milling tools into the ground, thereby milling the latter off. In the case of road milling machines, the milled material is typically removed from the milling drum box and transferred via a conveyor to a transport vehicle, which transports the milled material away. In the case of stabilizers and recyclers, on the other hand, the focus is more on mixing the underlying ground, and the milled material can usually be placed back on the ground behind the milling drum box, i.e., remain on the ground. Recyclers reuse removed asphalt layers to provide a new base layer. Stabilizers are typically used to mix an underlying ground with stabilizing materials to increase the ground's load bearing capacity.

The travel mechanism of a generic ground milling machine typically comprises travel units, said travel units being those parts of the travel mechanism that are at least partially in direct contact with the ground, in particular during travel operation of the ground milling machine. Typical ground milling machines have either three or four travel units, although other numbers of travel units are also conceivable. The travel units are typically configured as crawler tracks or wheels. For example, one or each travel unit may comprise a respective travel wheel in contact with the underlying ground during travel operation of the ground milling machine and having a wheel tread configured for direct contact with the ground. Alternatively, one or each travel unit may comprise a crawler track in contact with an underlying ground during travel operation of the ground milling machine and a drive wheel configured to drive the crawler track. The crawler track is usually configured for direct contact with the ground. Typically, two travel units are provided as seen at least in a longitudinal machine direction, or spaced apart in a longitudinal machine direction, which, according to the structure of the ground milling machine, can be divided into a front and a rear travel unit. The longitudinal machine direction corresponds to the front-/rear direction of the ground milling machine. The front and rear travel units are arranged separately from each other in the longitudinal machine direction.

The travel units of a generic ground milling machine may be configured for rotation about a steering axis for steering the ground milling machine. Additionally or alternatively, the travel units may be height-adjustable along a lifting axis via a lifting device. Both can apply to either all, individual or several of the travel units of the ground milling machine. Typically, at least the front and/or rear travel units as seen in a forward direction, in particular all of the travel units, can be steered about a respective steering axis to influence the direction of travel of the ground milling machine. Additionally or alternatively, the front and/or rear travel units as seen in the forward direction, in particular all of the travel units, may further each be height-adjustable along a lifting axis extending at least partially in a vertical direction via a respective suitable lifting device. The lifting axis and/or the steering axis are typically vertical or essentially vertical. In other words, the lifting axis and/or the steering axis are typically perpendicular to an underlying ground on which the ground milling machine is standing. The steering axis is the axis about which the respective travel unit rotates during a steering movement, or the center of rotation in a, typically horizontal, reference plane perpendicular to the steering axis. A typical lifting device is, for example, a lifting column via which the travel units, for example the track unit or the wheel, are connected to the machine frame. A generic road milling machine and, in particular, a generic travel mechanism unit, which is configured as a track unit with a lifting column, is shown, for example, in EP 2 230 160 A2. Typically, the travel units of generic ground milling machines are arranged on the machine frame or on the lifting device via a mounting device. For track units, the mounting device typically includes a track bracket that provides a connection between the lifting device and the travel unit. The lifting axis of the respective travel unit designates in particular the axis along which the travel unit is moved relative to the machine frame during a lift adjustment.

Maneuverability is generally of particular importance in the configuration of generic ground milling machines. It is important both for working operation, where milling tracks must be followed as precisely as possible or milling must be performed as close as possible along an obstacle, and for transport operation, for which the ground milling machine must typically be accommodated on a transport vehicle in a most space-saving manner possible. It is therefore known, for example, that at least one travel unit of the ground milling machine is configured to swivel via a swivel arm, so that the travel unit can be used in different positions depending on how much space is available. A ground milling machine of this type is shown, for example, in DE 299 24 566 1. Moreover, it is also known to configure the travel units of a ground milling machine such that they can be rotated by up to 90° to a longitudinal machine direction, so that the ground milling machine can be moved essentially transversely to its longitudinal machine direction or front/rear direction. Such a solution is shown in US 2016/0040372 A1. However, this system only works if the travel units, such as track units, are comparatively small or short. Typically, however, the track units or wheels of generic ground milling machines are so large that they would collide with each other if rotated up to 90° to the longitudinal machine direction. This is due to the fact that typically large contact areas of the travel units must be aimed for so that the high weight of the ground milling machine does not cause it to sink into the ground to be worked. In most generic ground milling machines, a sufficiently high steering angle for a travel movement perpendicular to the longitudinal machine direction is therefore not possible due to the extension of the travel units.

SUMMARY

Against this background, it is the object of the present invention to further improve the maneuverability of the ground milling machine both in working operation and for transport purposes.

Specifically, for a generic ground milling machine mentioned at the outset, the object is achieved by configuring the mounting device such that the travel unit can be moved at least partially transversely to the lifting axis and/or steering axis via a translational movement. In particular, via the translational movement, the travel unit can also be moved relative to at least parts of the mounting device and/or the machine frame of the ground milling machine. The translational movement in this case preferably takes place transversely or perpendicularly or essentially perpendicularly to the lifting axis and/or the steering axis. In other words, the translational movement preferably takes place in a horizontal plane, for example in a plane oriented parallel to the underlying ground on which the ground milling machine is standing. However, it is also possible that the translational movement does not take place exclusively in a horizontal plane, but also has a vertical component. If the trajectory of the travel unit is projected into a horizontal reference plane, the translational movement is at least partially transverse or perpendicular to the lifting axis and/or steering axis. The respective axis is of course not projected into the reference plane, but intersects the reference plane, in particular essentially perpendicularly or vertically.

According to the invention, at least one of the travel units is height-adjustable, in particular vertically, along a lifting axis via a lifting device and/or is rotatable about a steering axis for steering the ground milling machine. The invention further relates to the mounting device of this specific travel unit. However, it is also possible that multiple travel units are each configured in this manner, for example all front and/or all rear travel units of the ground milling machine. Preferably, all travel units of the ground milling machine are provided with the features mentioned herein. Each travel unit may either have only a lifting device with a lifting axis or only be configured to be steerable, i.e., have a steering axis. However, it is just as well possible for one or more, preferably all, of the travel units to have both a lifting device with a lifting axis and a steerable configuration, i.e., also to have a steering axis. The lifting axis may be coaxial with the steering axis. Alternatively, the lifting axis and the steering axis may be arranged separately from each other. They may be parallel or skewed to each other, and may or may not have an intersection point.

A translational movement, or translation, is a movement in which all points of the travel unit or all components of the travel unit undergo the same displacement. At a given time, speeds and accelerations of all points or components are identical, so that they move on parallel trajectories. This is in contrast to a rotational movement or rotation, where all points of the travel unit or all components of the travel unit move in a circle around a common axis. Any movement of a body, especially a rigid body, can be represented by a superposition of translational and rotational movements. The translational movement according to the invention may likewise occur simultaneously with a rotational movement. It is only important that, at least in addition to a rotation, a translation also takes place and that the travel unit or all components of the travel unit are moved with respect and/or relative to the lifting axis and/or the steering axis via this translational movement. During a translational movement of the crawler track, for example, the upper run of the crawler track moves at the same speed and in the same direction as the lower run of the crawler track. In contrast, during a travel movement of the milling machine on the crawler track, the upper run moves in an opposite direction to the lower run, and therefore this movement does not fall within the definition according to the invention. Although the crawler track also moves translationally with the ground milling machine during a travel movement of the ground milling machine, it is not moved relative to the lifting axis and/or the steering axis. A translational movement can thus take place in one movement step or in multiple successive movement steps. In the case of multiple movement steps, other movements are possible between those steps. If multiple travel units undergo translational movements, these movements may be performed simultaneously or in a time-shifted manner and/or at same or different movement speeds.

The translational movement according to the invention changes the position of the travel unit relative to the machine frame or relative to the connection of the travel unit to the machine frame, for example via a lifting column. In this way, it is possible to change how far the travel unit protrudes transverse to the lifting axis and/or transverse to the steering axis and thus to the connection to the machine frame, for example via a lifting column. In this way, the travel units can be moved, at least within the adjustment limits of the mounting device, while the machine frame of the ground milling machine is stationary. Conversely, the machine frame can be moved without the travel units moving. In this way, the relative position of the at least one travel unit up to all of the travel units can be changed relative to the rest of the machine, in particular relative to at least the machine frame. By reducing the protrusion of the travel units relative to the connection to the machine frame, for example the lifting column, a collision of the travel units with each other can be avoided at high steering angles. For example, the travel units can be moved outward from the machine center after performing a usual steering turn, so that their protrusion beyond the connection to the machine frame is significantly greater outward than toward the machine center. In this way, less space is required in the region of the machine center and a collision of the travel units with each other is avoided. Steering angles of up to 90° to the longitudinal machine direction or the front/rear direction of the ground milling machine can then be achieved. Thus, even in the case of a milling machine with large travel units and large ground contact areas of the track units or wheels, it is then possible to set a steering angle of 90° and move the ground milling machine perpendicular to the longitudinal machine direction. The corresponding movability of the travel units also allows an optimization of the space requirement of the ground milling machine on a transport vehicle. For example, the machine frame or the body of the ground milling machine can still be moved further by the translational movement of the travel units when the travel units already abut against a low obstacle, for example a bump or the like. In addition, maintenance works on the ground milling machine are also facilitated. For example, the translational movement of the travel units can provide more space in front of and/or behind the milling drum box, for example, to perform maintenance on the milling drum or a conveyor connected to the milling drum box. For this purpose, the travel units are moved away from the milling drum box by the translational movement according to the invention, for example in a steering position in the straight-ahead or longitudinal machine direction. This provides more space in the work area around the milling drum box for maintenance personnel. Additionally or alternatively, the tread width of the travel units to each other or of the ground milling machine can also be changed in this way with respect to a direction of travel, for example a forward direction. This can be advantageous when the ground milling machine is milling along an edge structure, such as a curb, and it is desired to ensure that the track of the ground milling machine runs entirely on the curb or entirely adjacent to the curb. It is also possible for the individual travel units to be positioned such that all of their individual travel tracks are free of overlap with each other.

If the travel unit comprises a track unit, it has at least one crawler track and a drive wheel, the drive wheel being configured to drive the crawler track. For this purpose, the drive wheel is preferably rotatable about a drive wheel axis. If, on the other hand, the travel unit comprises a travel wheel configured for direct contact with the ground, the travel wheel is preferably rotatable about a travel wheel axis. Typically, the rotation of the drive wheel about the drive wheel axis or the rotation of the travel wheel about the travel wheel axis is driven by a hydraulic motor. Alternatively, however, an electric motor or a mechanical connection to an internal combustion engine could also be used. Moreover, it may be preferred that the mounting device is configured such that the travel unit can be tilted about a swing axis. The tilting or swinging movement of the travel unit about the swing axis makes it easier to travel over edges or other uneven ground, for example. The drive wheel axis and/or the travel wheel axis and/or the swing axis are preferably configured or arranged essentially perpendicular or perpendicular to the lifting axis and/or steering axis and, in a straight-ahead position of the travel units, in particular also perpendicular to the longitudinal machine direction. It is now particularly preferred that the mounting device is configured such that the distance of the drive wheel axis or the travel wheel axis and/or the swing axis is adjustable relative to the lifting axis and/or the steering axis. The lifting axis, the steering axis, the drive wheel axis, the travel wheel axis and the swing axis do not describe any physical components but only virtual axes, for example straight lines in space, which serve as reference for the respective described movement. As used herein, a distance between two axes describes a shortest distance between those axes. Such a distance is defined, for example, by a connecting line between two points of the axes, said connecting line being perpendicular to both axes. A distance between coaxial or intersecting axes is then zero. The adjustment of the distance of the drive wheel axis or the travel wheel axis and/or the swing axis with respect to the lifting axis and/or the steering axis is carried out by the translational movement according to the invention. If a travel unit has both a swing axis and a drive wheel axis or a travel wheel axis, the distance between these axes and the lifting axis and/or the steering axis is changed by the same amount. This corresponding change in distance therefore also constitutes a possible way of defining the translational movement according to the invention.

If the travel unit is a track unit, additional axes may be used to describe the translational movement. For example, it is preferred that the travel unit comprises at least one guide wheel and, in particular, at least one track roller in addition to the crawler track and the drive wheel. The guide wheel is typically arranged on the track unit opposite the drive wheel and may also be configured to regulate the track tension, for example via a track tensioning device. One or more track rollers in turn support the crawler track on its underside, i.e., the ground-contacting side. The track rollers may be suspended, for example. The guide wheel is preferably rotatable about a guide wheel axis and the track roller is in particular rotatable about a track roller axis. It is then particularly preferred that the mounting device is configured such that the distance of the guide wheel axis and in particular also of the track roller axis is adjustable relative to the lifting axis and/or the steering axis. This is likewise effected via the travel unit's translational movement according to the invention. The distance of all axes to the lifting axis and/or to the steering axis is in this case also changed by the same amount. Depending on the position of the axes relative to each other, the distance can be increased or decreased or, in the case of symmetrical movement about the lifting axis and/or the steering axis, even remain the same. The partial distances of an approach toward and subsequent spacing from the lifting axis and/or the steering axis are each added in terms of amount, so that the amount of the distance change is also the same for all axes in this case. What is important is that the drive wheel axis, the guide wheel axis, the track roller axis and, if applicable, the swing axis or the travel wheel axis move by the same amount in the same direction as a result of the translational movement. This also distinguishes the translational movement according to the invention from conventional rotations of the travel unit during steering or from conventional swivel movements of the travel unit.

The travel unit, be it a wheel or a crawler track, has a current running direction defined by a rolling movement on the underlying ground. The mounting device may now be configured such that it enables translational adjustment of the travel unit relative to the lifting and/or steering axis in and against this running direction. Such an adjustment may therefore also be performed in particular by a traction drive unit of this travel unit and/or by a traction drive unit of one or more of the other travel units. Additionally or alternatively, however, the mounting device may also be configured such that it enables translational adjustment transverse and, in particular, perpendicular to the running direction of the travel unit. In this case, it is preferred if the travel unit is raised relative to the underlying ground or at least load-free to facilitate this type of adjustment. As already mentioned above, the translational adjustment is basically performed at least partially in a horizontal plane, or in other words: When the adjustment movement is projected into a virtual horizontal reference plane, there will always be a change in the position of the respective travel unit relative to the machine frame and/or the milling drum when the position of the travel unit before the translational adjustment is compared with the position of the travel unit after the translational adjustment. This type of orientation of the adjustment direction makes it possible, in particular, to vary the tread width of the ground milling machine.

Various solutions are conceivable for the specific configuration of the mounting device. For example, the mounting device may be configured in two parts, although configurations comprising three or more parts are also conceivable. Preferably, the mounting device comprises a track bracket attached to the lifting device or the machine frame and a track support attached to the travel unit, the track bracket and the track support being mounted movably on one another, in particular directly, in such a way that they are adjustable relative to one another translationally, in particular linearly. The corresponding adjustment is accomplished by the translational movement according to the invention. In particular, the track support is moved along with the travel unit, while the track bracket is fixed relative to the machine frame and the lifting axis and/or the steering axis. The attachment of the track support to the travel unit may in turn also be movable, so that the track support provides or defines, for example, the aforementioned swing axis for the travel unit. For this purpose, the track support has, for example, a swing joint via which the track support is connected to the travel unit.

In a possible and preferred configuration of the mounting device, the latter comprises at least one guide rail. The track bracket and the track support are then preferably positively connected to each other via the guide rail such that the track bracket and the track support are movable relative to each other along the guide rail. The positive connection between the track bracket and the track support is thus preferably configured such that it allows movement along the guide rail, but prevents movement transverse to the guide rail. For example, the guide rail may be arranged on the track bracket and the track support may have a guide element, the guide element engaging in or around the guide rail. However, the arrangement may of course also be vice versa, so that the guide rail is arranged on the track support and the guide element is arranged on the track bracket. The guide element is preferably equipped with at least one roller, roller bearing or slide bearing in order to reduce friction between the guide element, and thus for example the track support, and the guide rail, and thus for example the track bracket. If the track support is made up of two or more parts, each part of the track support is preferably equipped with a corresponding guide element.

However, the mounting device may also be configured differently. For example, the mounting device may have a swivel arm in addition or as an alternative to the guide rail. In particular, the track bracket may be connected to the track support(s) via the swivel arm, the swivel arm being configured and mounted such that it can effect the translational movement of the travel unit. Here again, the track support(s) is/are preferably moved, for example swiveled, together with the travel unit relative to the track bracket. The swivel movement of the swivel arm may be linear or arcuate. The swivel movement may also include a rotational movement of the travel unit. As already mentioned, what is important is that the translational movement is also included in the swivel movement sequence.

In a further configuration of the mounting device, the latter may also have a guide device, for example a link guide, in addition or as an alternative to the options described so far. For example, the track bracket comprises a link guide and the track support(s) comprise(s) at least one link block which is movably mounted in the link guide and can perform a movement specified by the link guide. Alternatively, again the arrangement may be vice versa, with the link guide arranged on the track support and the at least one link block on the track bracket. The link guide is configured, for example, as an elongated hole in which the link block is mounted by a slide or roller bearing. The shape of the link guide in this case determines the movement or trajectory of the link block and thus of the track support or the travel unit. Here again, the link guide may, for example, specify a linear or an at least partially arcuate movement, as long as the translational movement of the travel unit is included.

In order to guarantee safe working operation of the ground milling machine, it is preferred that the mounting device comprises a locking device. The locking device is in particular adjustable between a locking position and a release position, the locking device preventing a translational movement of the travel unit relative to the lifting axis and/or the steering axis in the locking position and allowing said movement in the release position. The locking device may comprise, for example, a bolt, bar, hook, or the like. The locking device may be configured, for example, to prevent or allow movement of the track support(s) relative to the track bracket. The adjustment of the locking device between the locking position and the release position can be carried out manually or automatically, for example controlled by a control device described in more detail below. In the case of automatic control of the locking device, the latter also comprises an actuator which moves the locking device between the locking position and the release position. The actuator may comprise, for example, a linear drive unit, in particular a hydraulic cylinder, or an electromagnet.

The translational movement of the travel unit can generally be accomplished in various ways. For example, it is possible that the translational movement is driven by a travel movement of the ground milling machine or of the travel unit to be moved translationally itself or of the other travel units of the ground milling machine. For example, a locking device on the travel unit, if present, may be released so that the travel unit is then generally mounted movably in such a way that it can perform the translational movement relative to the rest of the machine. If the ground milling machine is then moved relative to the respective travel unit in the direction of the translational movement, the travel unit remains in its original position, for example, due to its inertia and its own weight, resulting in the translational movement. It would also be possible for the ground milling machine to be stationary, for example held by other travel units that are stationary at this moment, while the travel unit to be adjusted is driven, in particular analogously to how it is driven during travel operation of the ground milling machine. The traction drive unit of the travel unit then moves the latter as a whole or as a functional unit relative to the rest of the ground milling machine, which is not moved along with the travel unit due to its own weight and inertia, especially when the locking device is released. In this way, the translational movement of the travel unit is accomplished. All in all, the translational movement of the travel unit is thus defined by the relative movement of the travel unit relative to the lifting axis and/or the steering axis. On the other hand, it does not require any movement of the travel unit relative to the footprint of the ground milling machine or the external environment, although this is also possible. The footprint of the ground milling machine in the present case designates a ground area which is defined by the outer surfaces of all travel units of the ground milling machine which are in contact with the ground, such that this area as a whole represents a rectangle the side edges of which are parallel to the longitudinal extension axis of the ground milling machine. The perimeter of the rectangle is defined such that it represents in each case the smallest perimeter required for all of the existing travel units to lie just within this perimeter with their ground-contacting outer surfaces. The area enclosed by this perimeter designates the footprint of the ground milling machine.

In a first embodiment, there may be no additional drive device for the translational movement of the travel unit. In particular, in this case the ground milling machine does not have a drive device that exclusively drives the translational movement of the travel unit. Alternatively, the mounting device may comprise a drive device, in particular a hydraulic cylinder, which drives the translational movement of the travel unit relative to the lifting axis and/or the steering axis. The drive device preferably comprises a linear drive unit such as a hydraulic cylinder or a rack-and-pinion drive, which may be driven by a hydraulic motor or an electric motor, for example. The drive device is preferably configured such that it enables a translational movement of the travel unit relative to the lifting axis and/or the steering axis in one or preferably two, in particular opposite, directions. If the travel unit is in a straight-ahead position, for example, the drive device may preferably drive a translational movement of the travel unit in or against the longitudinal machine direction. In this case, the mounting device is also preferably configured accordingly. Moreover, it is preferred that the drive device is controlled by a control device, either automatically or in response to a control command from an operator.

Generally, it is sufficient if the mounting device is configured such that the travel unit can is adjustable by the translational movement between an initial position and one, preferably two, in particular opposite, end position(s). In a preferred embodiment, for example, the mounting device may comprise at least one stop which specifies an end position for the translational movement of the travel unit relative to the lifting axis and/or the steering axis, preferably at least two stops being present which specify two opposite end positions on the mounting device. Preferably, the mounting device is configured such that the translational movement of the travel unit can take place over any distance within the structural possibilities of the mounting device. In other words, it is preferred that the mounting device can be adjusted to any position between the initial position and the end position(s) by the translational movement. Moreover, it is preferred that the travel unit can also be locked in these arbitrary positions by the locking device.

In order to obtain feedback on the current position of the travel unit, a position sensor and/or a camera is preferably provided, which determines a position of the travel unit relative to the lifting column and/or relative to the steering axis and/or relative to the mounting device and forwards it in particular to a control device. “Determining” the position thus also preferably comprises an optical detection of the position of the travel unit via a camera. The position sensor may be configured as a contact sensor, for example, so that different positions of the travel unit can be detected along the adjustment movement specified by the mounting device. For example, contact sensors may be provided in the end position(s) and/or in the initial position of the travel unit. A non-contact detecting sensor may also be used, for example an inductive proximity switch and/or suitable image processing software and a camera. Moreover, the position sensor may also be a sensor that detects the position of the drive device with respect to the translational movement of the travel unit, in particular continuously. For example, the sensor may be a draw-wire sensor or the like.

Generally, it is sufficient to achieve the advantages of the invention if only one travel unit is mounted on the ground milling machine via a mounting device according to the invention and can thus perform the translational movement according to the invention. The translational movement of this one travel unit alone can, for example, already increase the available space in front of or behind the milling drum box, at least on a side of the machine that can be used as maintenance access. Moreover, the footprint of the ground milling machine can be changed, for example, to allow easier transport. Generic ground milling machines typically have at least three and, in particular, four travel units. It is therefore preferred that at least two or, more preferably, at least three or, most preferably, all of the travel units of the ground milling machine are mounted on the ground milling machine via a mounting device according to the invention and can thereby perform the translational movement according to the invention. Therefore, the features, effects and advantages of all embodiments described herein are preferably applicable to all the travel units. According to a particularly preferred embodiment, at least all of the front and/or all of the rear travel units can execute a translational movement according to the invention. For example, it is preferred that two front and/or two rear travel units are provided. The two front and/or the two rear travel units preferably each comprise a lifting device with a lifting axis and/or a steering axis as well as a mounting device. They are thus in particular steerable about the steering axis. The mounting device is preferably configured such that the respective travel unit can be moved via a translational movement relative to the respective lifting axis and/or steering axis. In this way, the front travel units and/or the rear travel units can each undergo translational movement in a same direction. In this way, provided that the translational adjustment is not exclusively linear, in same directions and identical in terms of amount, the footprint of the ground milling machine can also be changed, for example, increased or decreased. For this purpose, for example, the respective front or rear travel units can both be adjusted in a same direction in the longitudinal machine direction toward the machine center and/or, for example, the front and rear travel units can be adjusted toward each other or in opposite directions. The free space available for maintenance works in front of or behind the milling drum box can also be increased considerably and on both sides due to this configuration.

The control device is in particular an electronic control device, for example a computer. The control device may be part of the on-board computer of the ground milling machine. For example, the control device is the on-board computer of the ground milling machine. The control device is configured to receive control commands from an operator and to control actuators of the ground milling machine in order to implement the control commands. For example, the control device is configured to control, either automatically or in response to a control command from an operator, the drive device for the translational movement of the travel unit. In particular, the control device may also be configured to control the locking device. The control device is thus preferably configured to control the actuator of the locking device. At the same time, the control device receives signals from sensors of the ground milling machine, for example the position sensor and/or the camera. Preferably, the control device comprises a display device, such as a screen or display. The control device may be configured to display the signal from the position sensor and/or the image from the camera on the display device for an operator. In this way, the operator is informed about the current position of the travel unit. Moreover, the control device is preferably configured to indicate on the display device whether the locking device is in the locking position or in the release position. The control device is also preferably configured to coordinate the translational movement of multiple travel units of the ground milling machine among each other. For example, the operator may enter a single control command at the control device signaling that he wants to move the ground milling machine transversely to the longitudinal machine direction. The control device then handles the movement of the travel units described above, which on the one hand have to be moved translationally and on the other hand have to be turned by up to 90° to the longitudinal machine direction. Another example is that the operator enters a control command at the control device that signals that the footprint of the ground milling machine should be reduced. In this case, the control device then coordinates a translational movement of at least part of the travel units, for example in the longitudinal machine direction, preferably such that the front travel units are moved backward in the longitudinal machine direction and/or the rear travel units are moved forward in the longitudinal machine direction, as a result of which the distance of the front and rear travel units from each other and thus also the footprint of the ground milling machine is changed. Finally, the operator may also enter a control command at the control device signaling that more clearance is required in front of and/or behind the milling drum box, for example for maintenance works. In this case, the control device then coordinates the translational movement of the front and/or rear travel units in the longitudinal machine direction to the front and/or to the rear, so that more space is provided in front of and/or behind the milling drum box. In order to achieve the respective function, the operator only has to enter a single control command representing the respective objective at the control device, whereupon the control device automatically carries out the further process and implementation of the control command.

The above-mentioned task is further achieved with the methods according to the invention described below. The methods according to the invention make use of a translational movement of a travel unit, whereby the latter is moved relative to the lifting axis and/or the steering axis, as already described above. In particular, the methods according to the invention each relate to a ground milling machine according to the invention or are carried out on such a ground milling machine. All features, effects and advantages of the ground milling machine according to the invention described herein therefore also apply mutatis mutandis to the methods according to the invention and vice versa. Merely to avoid repetitions, reference is made to the respective other explanations.

For example, the invention relates to a method for moving a ground milling machine, in particular a road milling machine or a stabilizer or a recycler, in a direction up to 90° transverse to a longitudinal machine direction. The ground milling machine is in this case preferably configured as discussed above. It has at least one travel unit mounted on the machine frame for rotation about a steering axis. The method comprises rotating the travel unit about the steering axis by up to 90° transverse to a longitudinal machine direction, the travel unit comprising a crawler track configured for direct ground contact and a drive wheel configured to drive the crawler track or a travel wheel with a wheel tread configured for direct ground contact. To avoid a collision between the travel units, the method further comprises a translational movement of the travel unit relative to the steering axis. Optionally, the travel unit may also be attached to the machine frame via a lifting device having a lifting axis. In this case, the translational movement may also be performed such that the travel unit, in addition to the steering axis, is moved relative to the lifting axis. It is irrelevant in which order the rotating and the translational movement of the travel unit is carried out. These steps may also be carried out simultaneously. A final step comprises moving the ground milling machine with the travel units rotated and moved in this manner. The direction of travel of the ground milling machine is then oriented transversely to the longitudinal machine direction by up to 90°. In this way, the maneuverability of the ground milling machine on the construction site is significantly increased. Moreover, this position of the travel units allows the ground milling machine as a whole to travel and move in a direction parallel to the rotation axis of the milling drum and thus transverse to the longitudinal direction of the ground milling machine. If the milling drum is lowered during this process and mills off ground material or if the ground milling machine is moved bit by bit and the milling drum is repeatedly lowered to mill off ground material, the ground milling machine can be used to mill a trench, for example a drainage trench or a so-called rain gutter. Also, for the method according to the invention, it is generally preferred that multiple up to all travel units of the ground milling machine can undergo translational movement in this manner. Nevertheless, a single travel unit is also sufficient. The translational movement of this one travel unit may, for example, already prevent a collision with the opposite travel unit located on the other side of the machine. Since the distances between the travel units do not have to be the same in a ground milling machine, it may be sufficient for avoiding a collision between the travel unit if one travel unit is moved translationally. For example, in a ground milling machine with a total of four travel units, the rear travel units may be arranged closer together than the two front travel units. If the distance between the two front travel units is sufficient for turning them by up to 90°, only one of the rear travel units may need to undergo translational movement to also ensure that the rear travel units also do not collide in the event of such a steering angle.

The invention also relates to a method for positioning a ground milling machine, in particular a road milling machine or a stabilizer or a recycler, for maintenance works and/or transport. Preferably, such a machine is a ground milling machine according to the invention as described above. The ground milling machine preferably comprises two front and/or two rear travel units, each of which has a lifting device with a lifting axis and/or a steering axis. The method comprises translationally moving the two front and/or the two rear travel units relative to the respective lifting axis and/or steering axis and transversely to the respective lifting axis and/or steering axis. Preferably, the two front travel units are moved in a same direction along a longitudinal machine direction and/or the two rear travel units are moved in a same direction along a longitudinal machine direction. In particular, the front travel units are moved relative to the rear travel units in a same direction or in a different direction, for example in the opposite direction, along the longitudinal machine direction. The method thus comprises both translationally moving solely the front travel units and translationally moving solely the rear travel units of the ground milling machine. Moreover, the method in particular also comprises translationally moving both the front and rear travel units of the ground milling machine. If, for example, the front and rear travel units of the ground milling machine are moved translationally in a same direction, the machine body shifts with respect to its contact points or contact area. Depending on the direction of movement, the machine body shifts forward or backward in the longitudinal machine direction, for example. In addition, however, it would also be possible for the machine body to be displaced in one direction or another transverse to the longitudinal machine direction. This would then also require translational movement of the travel units in a transverse machine direction. In this way, the ground milling machine can be positioned on a transport vehicle, such as a low-bed trailer, in a space-saving manner. Finally, the front and rear travel units of the ground milling machine may also undergo translational movement in opposite directions. For example, the front and rear travel units may be moved toward or away from each other along the longitudinal machine direction. If the travel units are moved toward each other along the longitudinal machine direction, the total footprint required by the ground milling machine is reduced, which can be helpful when space is limited, for example on a low-bed trailer. If, on the other hand, the front and rear travel units are moved away from each other, there is greater clearance for maintenance works both in front of and behind the milling drum box.

The methods according to the invention can be further modified in various ways. For example, it is possible for the respective method to be carried out automatically by a control device, in particular upon a control command entered by an operator. As already described above, the control device then controls the corresponding actuators, for example, to set a desired steering angle and a desired translational movement of the travel units. In this case, for example, the control device may also issue a warning to the operator if the desired sequence, which the operator has set by his control command, cannot be carried out. For example, the control device may be configured to detect when the desired steering angle cannot be set, for example due to a collision of the travel unit with an obstacle. Moreover, the control device may detect if the desired translational movement of the travel unit cannot be performed, for example also due to collision with an obstacle. This may be detected, for example, via the position sensor already described above. In this case, the control device issues a warning to the operator. Such a warning may be an indication on the display device. In addition, the warning may also comprise a warning light or an audible warning, such as a warning sound.

It is preferred if the position of the travel unit relative to the lifting axis and/or the steering axis is monitored, for example by a position sensor and/or by at least one camera. In addition, displaying the position of the travel unit relative to the lifting axis and/or the steering axis by the control device, for example on a display device, is also preferred. In addition to displaying the camera image on the display device, the control device may also be configured to evaluate the camera image and, for example, to identify the position of the travel unit relative to the translational movement from the image data. For example, the control device may then display more precise information to the operator, for example in the form of a numerical value or a pictogram.

In addition, the control device may be configured to implement safety measures during operation of the ground milling machine with translationally moving travel units. For example, due to the translational movement of the travel units, the stability or tilt resistance of the ground milling machine may change. In order to take this into account, it is preferred that the maximum travel speed of the ground milling machine is limited when the travel unit is moved translationally relative to the respective lifting axis and/or steering axis, in particular by the control device. In other words, when the travel units are moved translationally (i.e., when at least one travel unit is not in the initial position), the ground milling machine may only be moved at a reduced travel speed compared to normal travel operation. A corresponding throttling of the maximum speed may be specified by the control device. Alternatively, the ground milling machine may be moved at normal travel speed, but if a threshold value is exceeded, a warning is issued or displayed to the operator by the control device. In this way, the operator may assess by himself whether or not it is possible to move the ground milling machine at the given speed in the current situation despite translationally moved travel units.

BRIEF DESCRIPTION OF THE DRAWINGS

The invention will be explained in more detail below by reference to the embodiment examples shown in the figures. In the schematic figures:

FIG. 21 is a bottom view of a ground milling machine with travel units in a straight-ahead position and narrow tread width;

FIG. 22 shows the view shown in FIG. 21 with travel units in a straight-ahead position and wide tread width; and FIG. 23 is a perspective view of an alternative travel mechanism unit.

DETAILED DESCRIPTION

Figure 1:
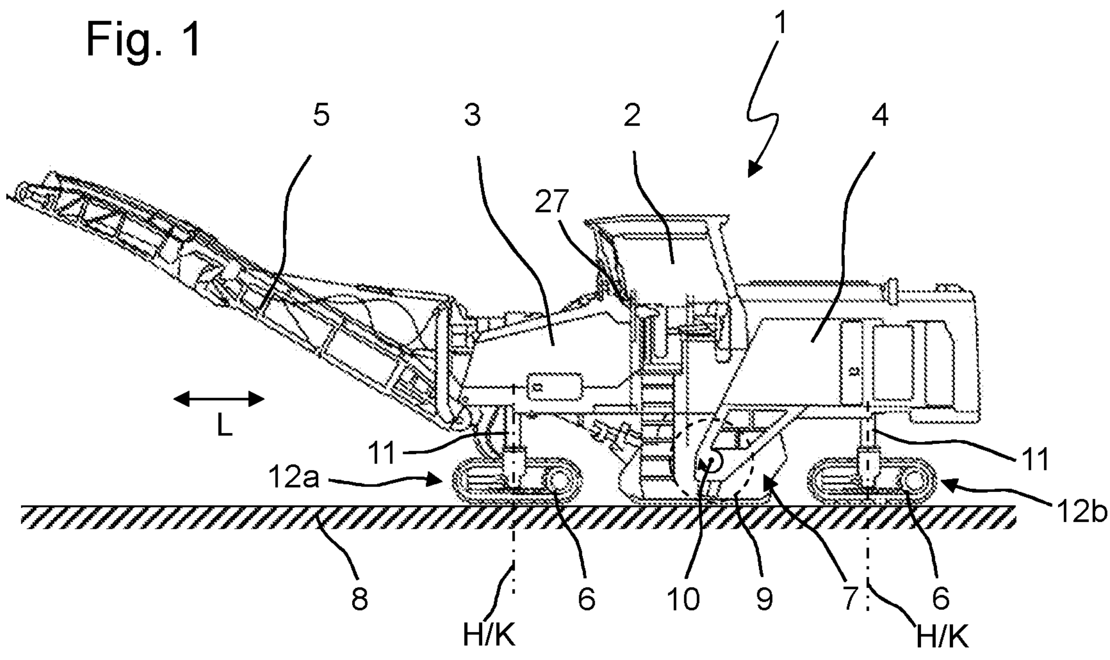
FIG. 1 is a side view of a road milling machine.

Like parts or functionally like parts are designated by like reference numerals in the figures. Recurring parts are not designated separately in each figure.

Figure 2:
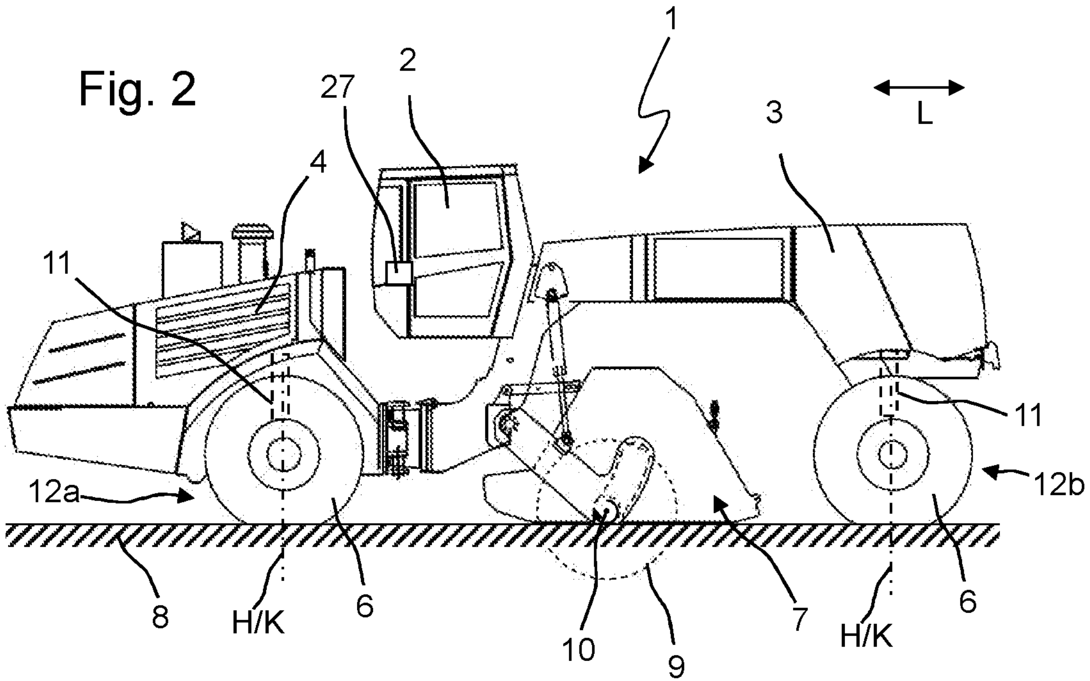
FIG. 2 is a side view of a stabilizer/recycler.

FIGS. 1 and 2 each show side views of ground milling machines 1 according to the invention. More specifically, FIG. 1 shows a road milling machine, while FIG. 2 shows a recycler/stabilizer. The ground milling machines 1 of FIGS. 1 and 2 preferably have a machine frame 3 with an operator platform 2 from which an operator can control the ground milling machine 1, for example via the control device 27. For propulsion, the ground milling machines 1 preferably have a drive motor 4, which may be an internal combustion engine or an electric motor and is typically a diesel internal combustion engine. The travel mechanism of the ground milling machines 1 preferably comprises travel mechanism units 12, more precisely front travel mechanism units 12*a* and rear travel mechanism units 12*b* spaced apart from each other in a longitudinal machine direction L, which rest on the underlying 8 and support the machine frame 3. The working device of the ground milling machines 1 is preferably a milling drum 9 mounted in a milling drum box 7 for rotation about a rotation axis 10. The milling drum 9 is typically equipped with milling tools that mill off the underlying ground 8 as the milling drum 9 rotates. While the milled material in the case of the road milling machine according to FIG. 1 is preferably transferred to a transport vehicle via a conveyor 5 and transported away, the milled material in the case of the recycler/stabilizer according to FIG. 2 is preferably placed back on the underlying ground 8 behind the milling drum box 7.

The travel mechanism units 12 comprise in particular travel units 6, which are configured for direct contact with the underlying ground 8, and in the example shown in each case a lifting device 11 configured for vertical height adjustment of the travel units 6. The respective travel unit 6 is attached to the machine frame 3 via the lifting device 11. As shown, the travel units 6 of the road milling machine according to FIG. 1 may comprise track units, while the travel units 6 of the stabilizer/recycler according to FIG. 2 may comprise wheels or travel wheels. Of course, the road milling machine could also be equipped with wheels or travel wheels and the stabilizer/recycler with track units. The travel units 6 have a current running direction LF, which indicates the direction in which the respective travel unit 6 is rolling on the ground or in which the travel unit 6 is moving in ground contact. The lifting device 11 may be lifting columns, for example. Alternatively, it would also be conceivable to use a lift/swivel gear unit, for example using parallelogram linkages, as the lifting device 11. The height adjustment by the lifting device 11 preferably takes place along a lifting axis H, which is typically vertical. The lifting axis H is a virtual reference axis rather than a physical component. In the examples according to the figures, the lifting axis H is located within the lifting device 11. However, this does not necessarily have to be the case. What is important is that the lifting axis H is set or defined stationary relative to the lifting device 11. It could therefore also be located outside the lifting device 11. In the shown embodiments according to FIGS. 1 and 2, the shown travel units 6 are all configured to be steerable. They are therefore configured to rotate about a steering axis K, said steering axis K preferably running parallel to the lifting axis H. The steering axis K is therefore preferably also vertical. In addition, the steering axis K is coaxial with the lifting axis H in the examples shown. It is important to note, however, that not all of the travel units 6 have to be configured to be steerable, so that not each of the travel units 6 has to have a steering axis K. Moreover, the steering axis K does not have to be parallel and/or coaxial to the lifting axis H. These are merely preferred embodiments.

Figure 3:
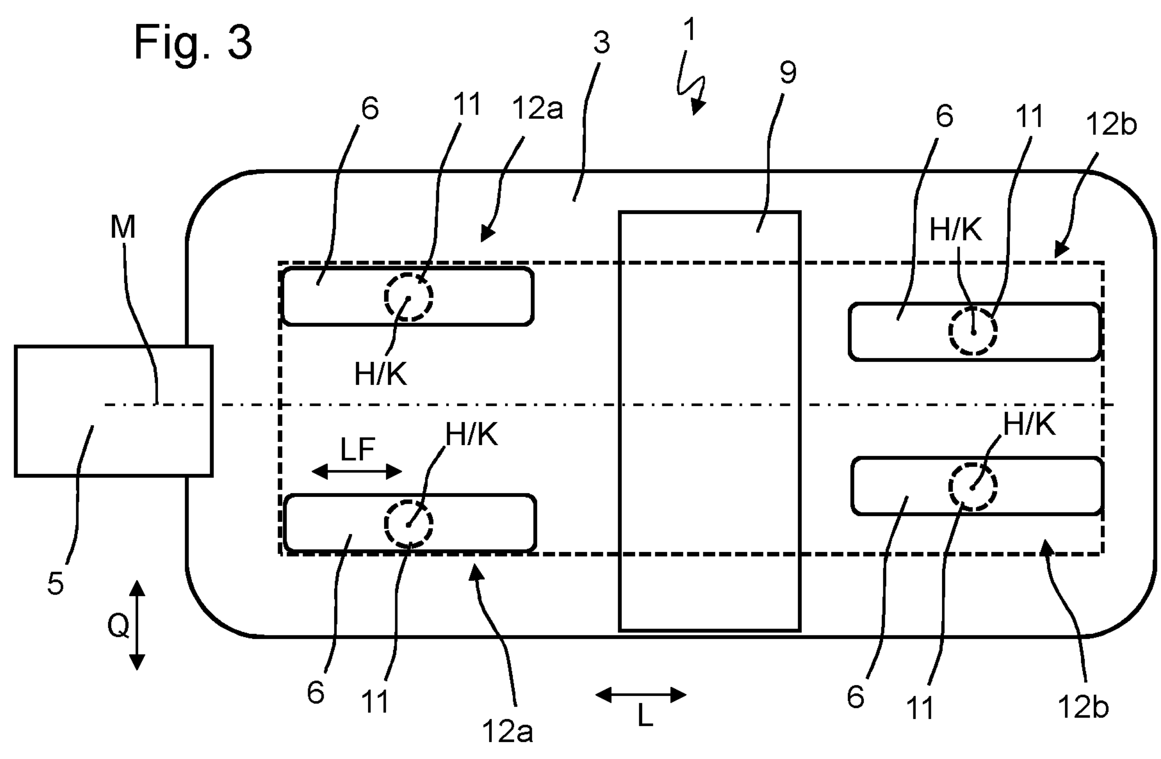
FIG. 3 is a bottom view of a ground milling machine with travel units in a straight-ahead position.

FIGS. 3-6 each show a schematic bottom view of the ground milling machine 1 and illustrate the application case of the invention in which a steering angle of up to 90° to the longitudinal machine direction L is realized. In FIGS. 3-6, the front end of the ground milling machine 1 in the longitudinal machine direction L is shown on the left and the rear end of the ground milling machine 1 is shown on the right. In FIG. 3, all travel units 6 are in a straight-ahead position, i.e., a position in which a travel direction of the ground milling machine 1 is essentially parallel to the longitudinal machine direction L during travel operation of the travel units 6. As can be seen from FIG. 3, the front travel mechanism units 12*a* may be spaced apart from each other in a transverse machine direction Q by a different distance than the rear travel mechanism units 12*b*. The transverse machine direction Q may preferably be perpendicular to the longitudinal machine direction L and designates, for example, a left/right direction of the ground milling machine 1. For example, the front travel mechanism units 12*a* may be spaced apart from each other by a greater distance in the transverse machine direction Q than the rear travel mechanism units 12*b*. This may typically be the case with road milling machines. Of course, it may also be the case that the rear travel mechanism units 12*b* are spaced apart by a greater distance from each other in the transverse machine direction Q than the front travel mechanism units 12*a*. Moreover, the distance between the front travel mechanism units 12*a* and the rear travel mechanism units 12*b* in the transverse machine direction Q may also be the same.

Figure 4:
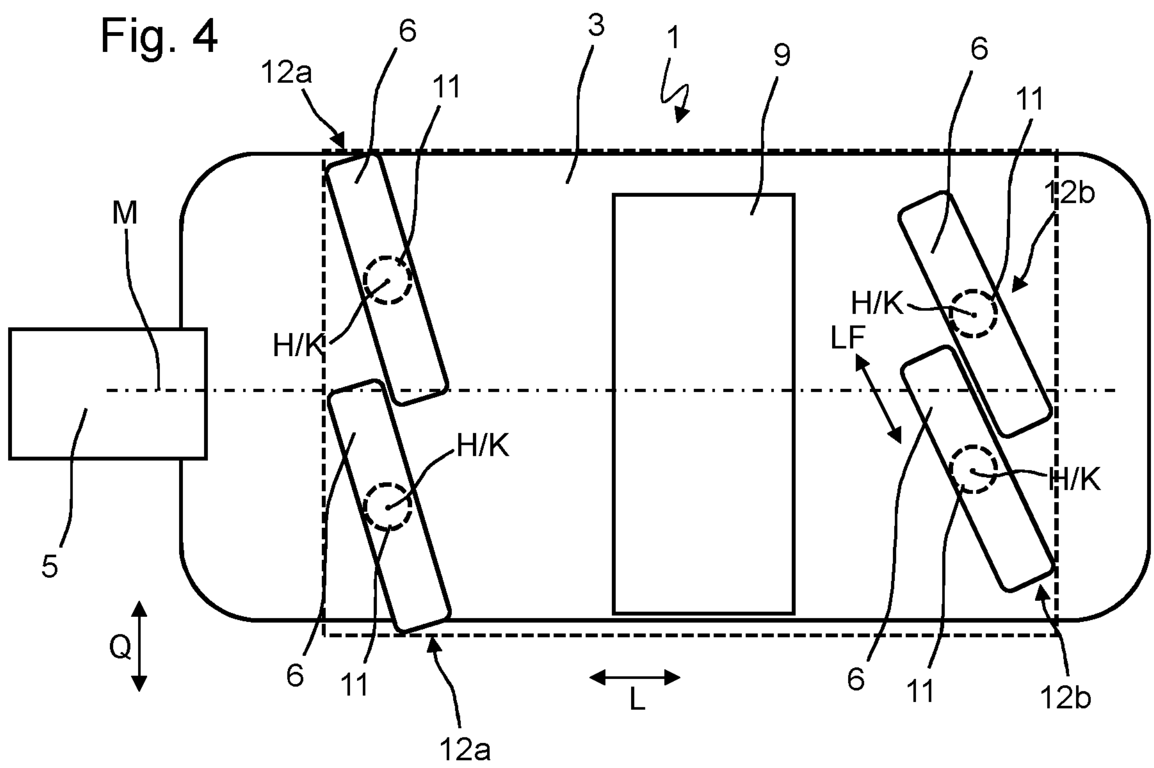
FIG. 4 is a bottom view of a ground milling machine with turned travel units.

FIG. 4 shows an example of a steering turn of the travel units 6 to the right. In particular, FIG. 4 shows the maximum steering position that the travel units 6 can assume before they collide with each other. Due to the size of the travel units 6, it is typically not possible with conventional ground milling machines 1 to set a larger steering angle than shown in FIG. 4. The maximum steering angle of the travel units 6 is in this case significantly less than 90° in relation to the longitudinal machine direction L. In particular, it is therefore not possible to set a direction of travel of the ground milling machine 1 perpendicular to the longitudinal machine direction L. The steering turn to the right has only been selected as an example. The same problem occurs when steering to the left.

Figure 5:
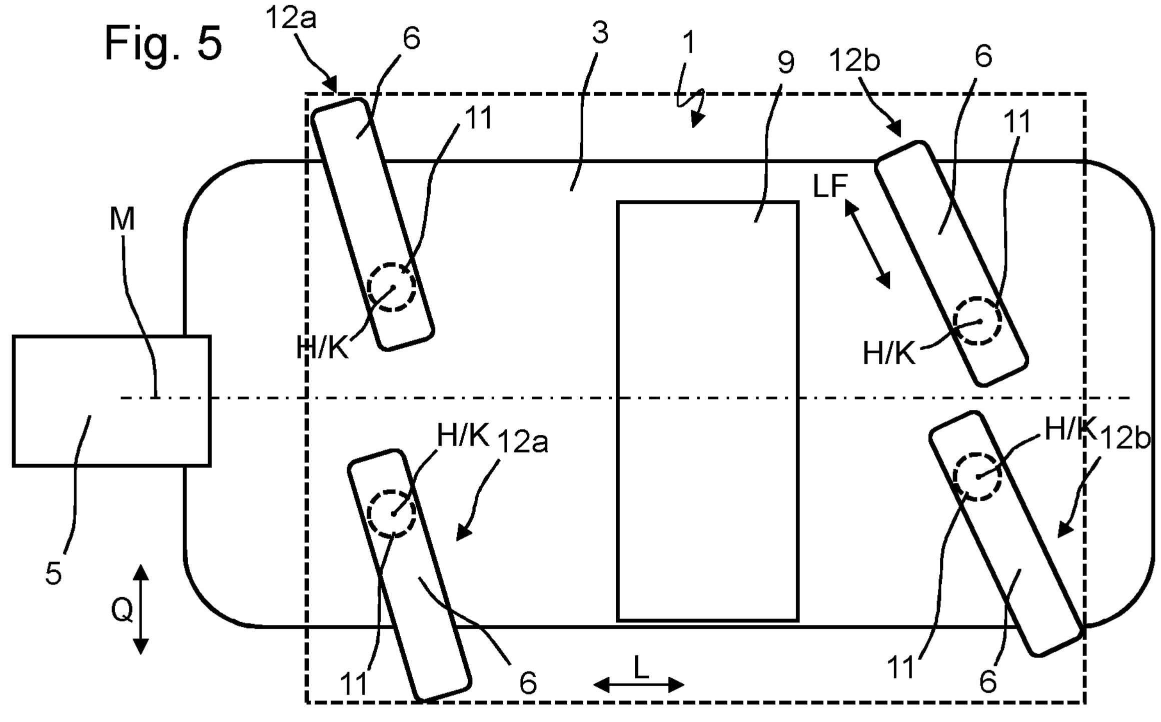
FIG. 5 is a bottom view of a ground milling machine with turned and translationally moved travel units.

FIG. 5 shows how the present invention can solve this problem. Compared to the situation in FIG. 4, the travel units 6 have been moved in particular translationally in such a way that they have moved with respect to the lifting axis H and/or the steering axis K. The movement relative to the lifting axis H and/or the steering axis K takes place in particular at least partially transverse to these axes, for example at least partially in a horizontal reference plane. The translational movement of the travel units 6 preferably takes place such that in the case of a steering angle deviating from the straight-ahead position the travel units 6 are arranged further away from a longitudinal machine center plane M than before the translational movement. The longitudinal machine center plane M is a virtual reference plane which preferably extends in vertical direction and in particular parallel to the longitudinal machine direction L. Moreover, the longitudinal machine center plane M is preferably located in the center of the ground milling machine 1 with respect to its transverse machine direction Q. It therefore extends, for example, centrally between the two lateral outer sides of the ground milling machine 1, i.e., in particular of those outer sides which extend in the longitudinal machine direction L. In order to avoid collision in the region of the machine center with respect to the transverse machine direction Q, the travel units 6 are therefore displaced out of this machine center by the translational movement. In other words, the translational movement moves the travel units 6 away from the longitudinal machine center plane M. It is irrelevant whether the translational movement of the travel unit 6 takes place before or after an at least partial setting of the desired steering angle, as long as a collision of the travel units 6 with each other is avoided. What is important is that in the case of a steering angle deviating from the straight-ahead position, due to the translational movement, the travel units 6 are arranged further away from the machine center with respect to the transverse machine direction Q or from the longitudinal machine center plane M. It is also irrelevant in which direction the travel units 6 are turned to adjust the steering angle. For example, the two front travel units 12*a* and/or the two rear travel units 12*b* may each be rotated in a same direction or in opposite directions to adjust the steering angle, in particular about the steering axis K. What is important is that the collision of the travel units 6 in the region of the center in the transverse machine direction Q or the longitudinal machine center plane M is avoided by the translational movement of the travel units 6.

Figure 6:
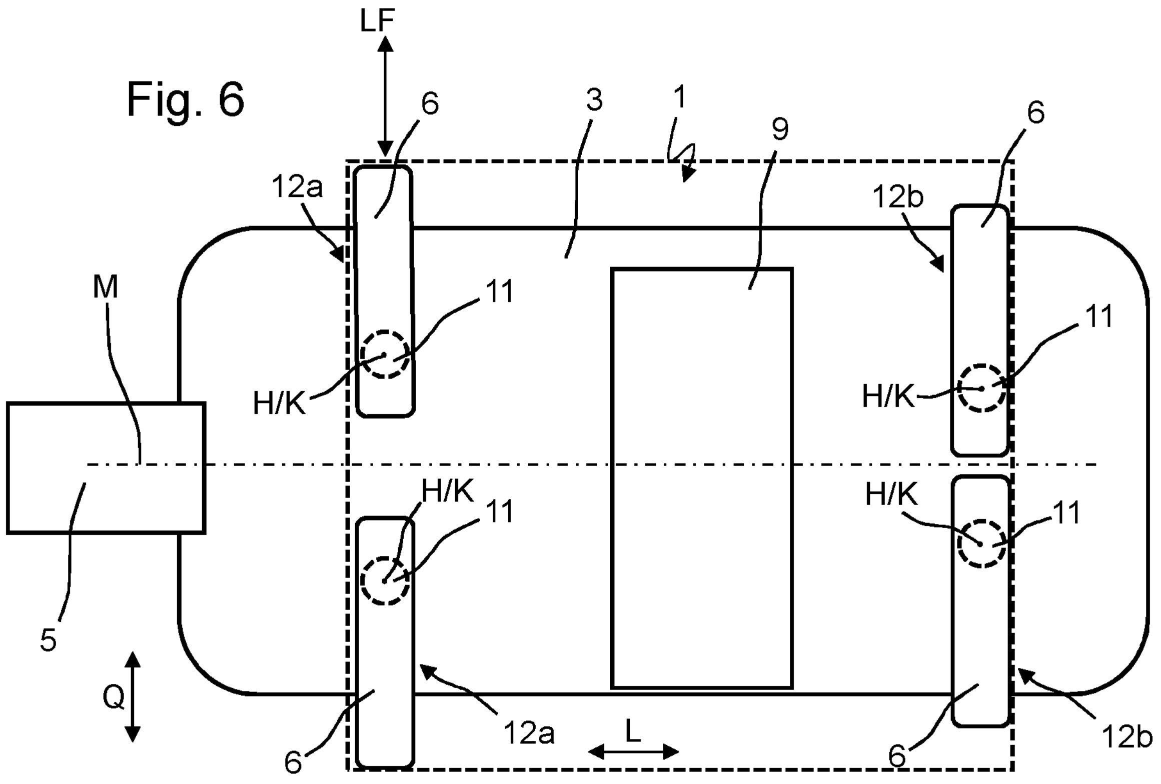
FIG. 6 is a bottom view of a ground milling machine with translationally moved travel units turned perpendicular to the longitudinal machine direction.

FIG. 6 then shows the situation in which the travel units 6 have a steering angle of 90° relative to the longitudinal machine direction L. Despite this steering angle, there is no collision between the travel units 6. In this situation, the ground milling machine 1 can be moved in particular perpendicular to the longitudinal machine direction L, for example in the transverse machine direction Q, by driving the travel units 6.

FIGS. 3 to 6 further illustrate that with the described translational adjustment of the travel units 6, the footprint SF of the ground milling machine 1 is considerably more variable compared to pure steering movements. The footprint SF in this case corresponds to the rectangular area of the underlying ground within which the travel units are in contact with the underlying ground. By definition, the rectangle extends with a pair of its longitudinal edges parallel to the longitudinal extension or machine center plane M. In particular, a comparison of the footprint SF in FIG. 4 with maximum steering angle from the conventional initial position of the travel units 6 with the footprint SF in FIG. 6, in which the travel units are moved apart to the right and left sides of the ground milling machine, illustrates this effect.

Figure 7:
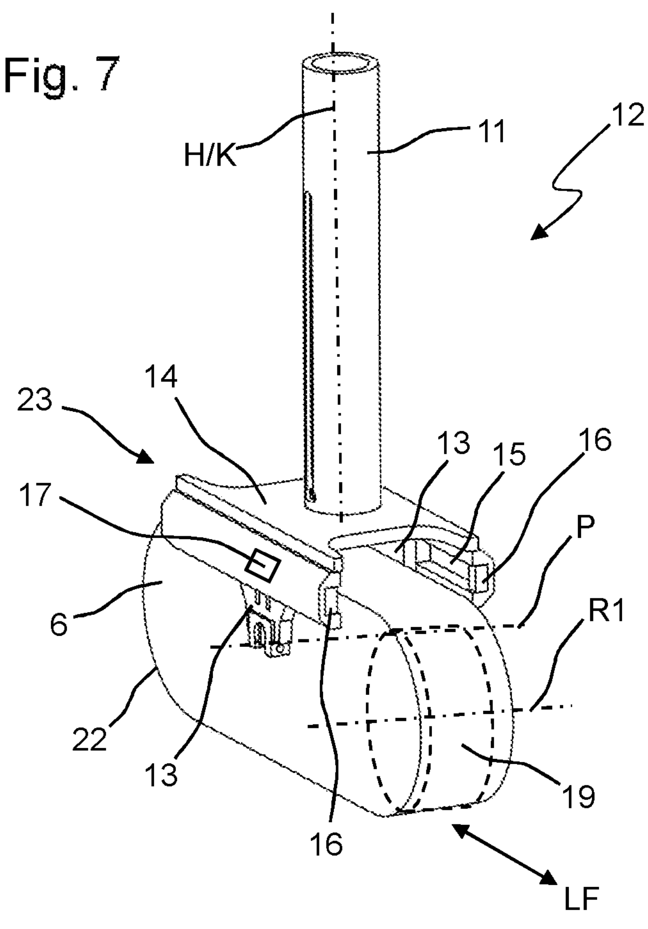
FIG. 7 is a perspective view of a travel mechanism unit.
Figure 8:
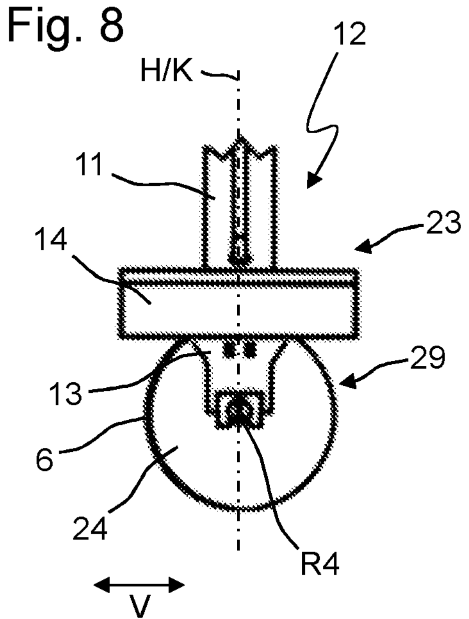
FIG. 8 is a side view of a travel mechanism unit with a travel wheel.

FIGS. 7 and 8 show exemplary embodiments of the travel mechanism units 12 and travel units 6, respectively. The travel mechanism unit 12 as shown in FIG. 7 comprises, for example, a travel unit 6 configured as a track unit, which may be arranged via a mounting device 23 on a lifting device 11 configured as a lifting column. The travel unit 6 preferably comprises a crawler track 22 configured for direct ground contact and, in particular, also a drive wheel 19, which is preferably configured to rotate about a drive wheel axis R1 and drives the crawler track 22 of the travel unit 6 by this rotation. The drive wheel axis R1 is in this case preferably oriented perpendicular to the lifting axis H and/or the steering axis K. The mounting device 23, in turn, preferably comprises a track bracket 14, which may be arranged on the lifting device 11, for example. The track bracket 14 may have a guide rail 15, via which the track bracket 14 is preferably connected to a track support 13. The track support 13 is preferably connected to the travel unit 6 and attaches it to the track bracket 14 and thus also to the lifting device 11 or the machine frame 3. Particularly preferably, the travel unit 6 is mounted on the track support 13 such that it can rotate, swing or tilt, in particular about a swing axis P. The swing axis P is preferably perpendicular to the lifting axis H and/or to the steering axis K and/or parallel to the drive wheel axis R1. The track support 13 is preferably mounted on the track bracket 14, in particular in the guide rail 15, such that it can be moved translationally together with the travel unit 6 relative to the track bracket 14, preferably along the guide rail 15. Moreover, the mounting device 23 may comprise at least one or more stops 16, which in particular limit the translational movement of the track support 13 relative to the track bracket 14 and thereby preferably define end positions for the translational movement. Finally, a position sensor 17 may be provided which detects the current relative position of the track support 13 with respect to the track bracket 14 and thus in particular of the travel unit 6 with respect to the lifting axis H and/or with respect to the steering axis K.

Figure 9:
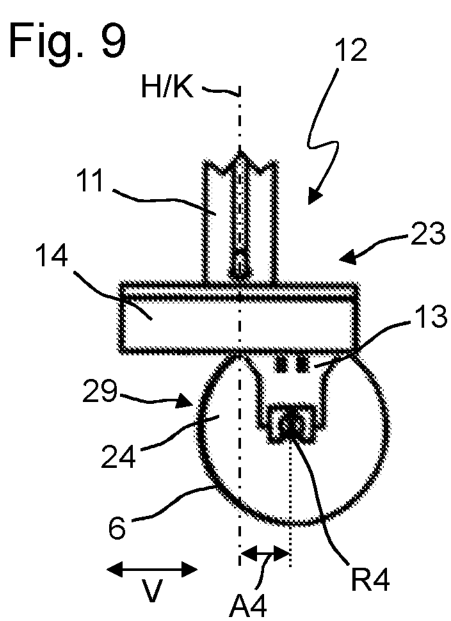
FIG. 9 is a side view of a travel mechanism unit with a translationally moved travel wheel.

FIGS. 8 and 9 each show a side view of an embodiment example in which the travel unit 6 comprises a travel wheel 24 having a wheel tread 29 configured for direct ground contact. Generally, all the features of the track version described herein may also apply to this embodiment and vice versa. The travel wheel 24 is preferably rotatable about a travel wheel axis R4. In particular, the travel wheel 24 is rotated about this travel wheel axis R4 during travel operation of the ground milling machine 1, thus rolling on the underlying ground 8. A comparison with FIG. 9 shows how the travel unit 6, in this case specifically the travel wheel 24, performs a translational movement together with the track support 13 and is moved in particular relative to the lifting axis H and/or the steering axis K and in particular also relative to the track bracket 14. The translational movement according to a comparison of FIGS. 8 and 9 takes place along a displacement direction V specified in particular by the mounting device 23. Starting from the initial position in FIG. 8, the movement may just as well take place along the displacement direction V in the opposite direction of that shown in FIG. 9. The translational movement of the travel unit 6 changes the distance A4 of the travel wheel axis R4 to the lifting axis H and/or steering axis K. In the initial position in FIG. 8, a situation is shown in which the travel wheel axis R4 intersects the lifting axis H and/or steering axis K and the distance A4 of the travel wheel axis R4 to the lifting axis H and/or steering axis K is therefore zero. FIG. 9 shows that the distance A4 is greater than zero due to the translational movement and has therefore changed. This change in distance A4 distinguishes the translational movement from a steering movement, which is a rotation about the steering axis K. During such a rotation of the travel unit 6 about the steering axis K, the distance A4 does not change, in contrast to the translational movement according to the invention.

Figure 10:
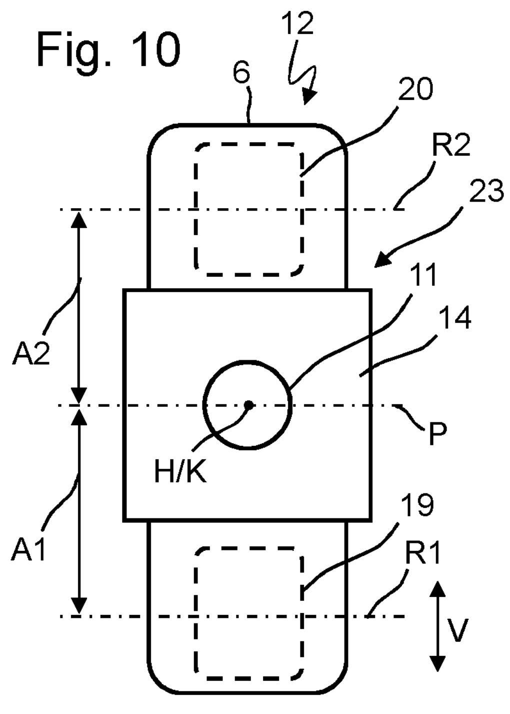
FIG. 10 is a top view of a travel mechanism unit.
Figure 11:
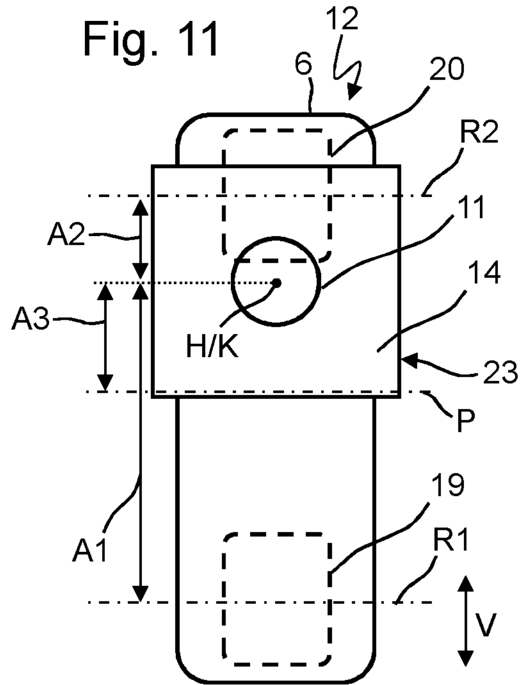
FIG. 11 is a top view of a travel mechanism unit with translationally moved travel unit.

FIGS. 10 and 11 illustrate this again for an embodiment example in which the travel unit 6 comprises a track unit. In addition to the drive wheel 19, the travel unit 6 may also comprise at least one guide wheel 20, which is configured to rotate about a guide wheel axis R2. Typically, the guide wheel 20 together with the drive wheel 19 is configured to adjust the tension of the crawler track 22. The guide wheel axis R2 is in this case preferably oriented parallel to the drive wheel axis R1 and/or swing axis P or perpendicular to the lifting axis H and/or steering axis K, respectively. FIGS. 10 and 11 show that a translational movement of the travel unit 6 in displacement direction V changes in particular the distance A1 of the drive wheel axis R1 to the lifting axis H and/or steering axis K and/or the distance A2 of the guide wheel axis R2 to the lifting axis H and/or steering axis K and/or the distance A3 of the swing axis P to the lifting axis H and/or steering axis K. In the embodiment example shown, and in the case of a translational movement of the travel unit 6 in the direction shown along the displacement direction V, the distance A1 increases, the distance A2 decreases, and the distance A3 assumes an amount greater than zero. Due to these changes in the distances A1, A2, A3, the translational movement of the travel unit 6 differs from a steering movement effected by rotation about the steering axis K.

Figure 12:
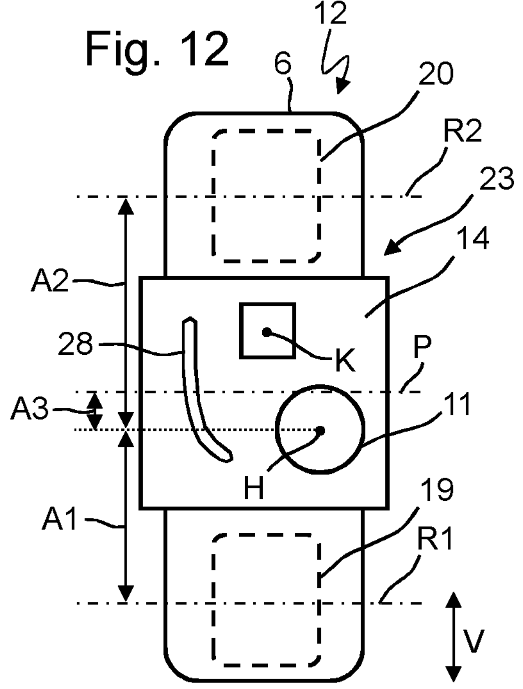
FIG. 12 is a top view of another travel mechanism unit.
Figure 13:
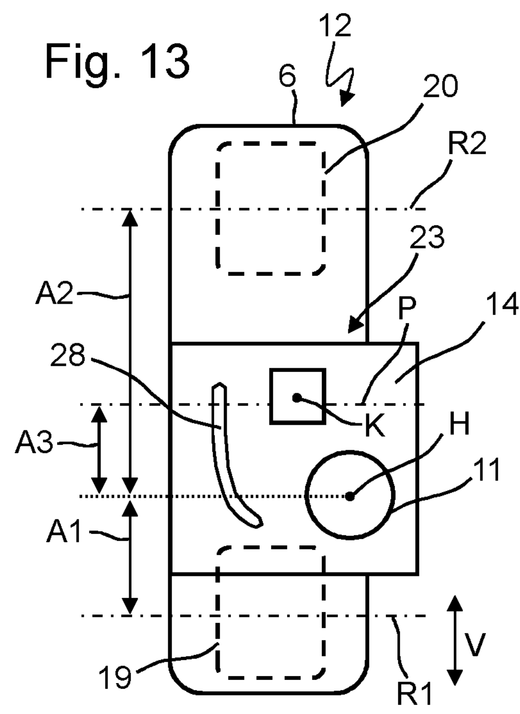
FIG. 13 is a top view of a further travel mechanism unit with translationally moved travel unit.

FIGS. 12 and 13 illustrate in general terms deviations that may or may not be present in all embodiment examples. For example, it is shown that the lifting device 11 and, for example, thereby also the lifting axis H do not have to be arranged centrally on the track bracket 14. The lifting device 11 and thus also the lifting axis H may also be arranged eccentrically offset, for example. Furthermore, it is shown that the lifting axis H does not have to be coaxial with the steering axis K. As shown, the lifting axis H and the steering axis K may also extend separately from each other. They may still be parallel or also oblique or skewed to each other. As shown in particular in FIG. 12, the distance A3 between the swing axis P and the lifting axis H does not have to be zero in the initial position, but may be greater than zero. Although the distances A1, A2, A3 in FIGS. 12 and 13 are still related to the lifting axis H, they might just as well be related to the steering axis K. Furthermore, FIGS. 12 and 13 show an alternative configuration of the mounting device 23. In the embodiment example shown, it does not comprise a guide rail 15, but a guide device 28, which may be configured as a link guide, for example. In particular, the guide device 28 comprises an elongated hole extending at least partially in the displacement direction V, in which, for example, a link block may be movably mounted, in particular in a sliding fashion. During the translational movement of the travel unit 6, the latter is guided along the guide device 23 and in particular along the elongated hole. For this purpose, the elongated hole is arranged on the track bracket 14, for example, and the link block on the track support 13, or vice versa. The guide device 28 and in particular the elongated hole is at least partially arcuate, so that the translational movement of the travel unit 6 takes place both in the displacement direction V and at least partially transversely to the displacement direction V. The translational movement therefore does not have to be purely linear in one direction, but may also include a curved trajectory, for example. In addition, the translational movement may also be superimposed by a rotation, for example. What is important is that a translational movement takes place at all as already described above. As can also be seen from FIGS. 12 and 13, the translational movement along the guide device 28 also changes the distances A1, A2, A3 already described above.

Figures 14, 15, 16:
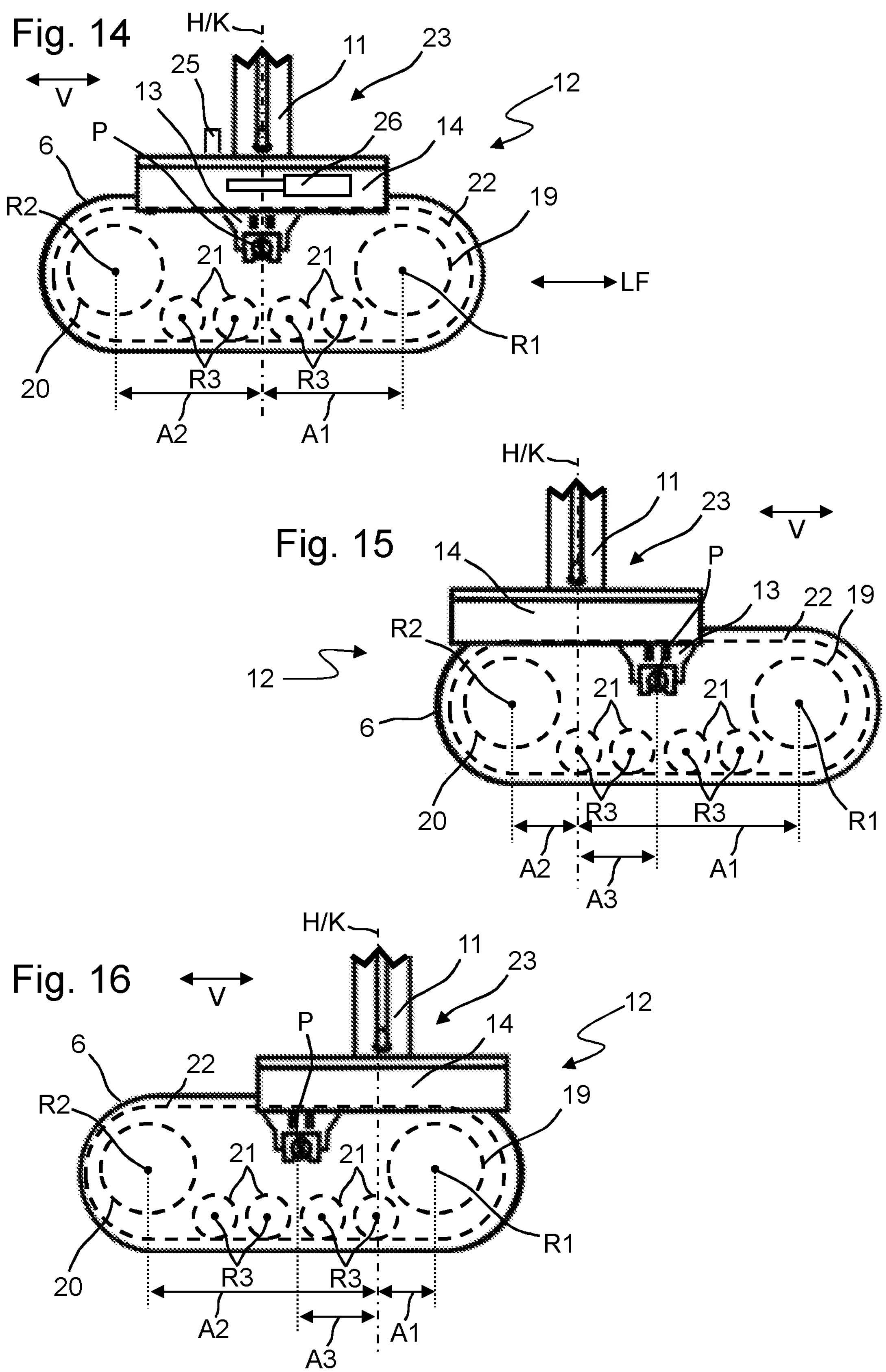
FIG. 14 is a side view of another travel mechanism unit.
FIG. 15 is a side view of another travel mechanism unit with translationally moved travel unit.
FIG. 16 is a side view of another travel mechanism unit with a travel unit translationally moved in an opposite direction to that shown in FIG. 15.

The corresponding movement sequences in an embodiment example with a travel unit 6 comprising a track unit are also shown again in the side views of FIGS. 14, 15 and 16. Again, the changes in the distances A1, A2, A3 due to the translational movement of the travel unit 6 are shown. In addition, FIG. 14 shows an example of a releasable locking device 25, which may be, for example, a bolt or the like. The locking device 25 is preferably configured to block or allow the translational movement of the travel unit 6 relative to the lifting axis H and/or the steering axis K. For this purpose, the locking device 25 is preferably movable between a locking position and a release position. The locking device 25 may be manually adjustable between the locking position and the release position, or the locking device 25 is adjusted by an actuator, for example an actuator controlled by the control device 27. The translational movement of the travel unit 6 may generally be driven by a traction drive unit of the travel unit 6 itself or of at least one other travel unit 6 of the ground milling machine 1. Alternatively, a drive device 26 may also be provided, which is configured to drive the translational movement of the travel unit 6. The drive device 26 may be configured, for example, as a hydraulic cylinder, in particular as a double-acting hydraulic cylinder, but may also have other actuators.

As shown in FIGS. 14, 15 and 16, in addition to the drive wheel 19 and, if applicable, the guide wheel 20, the travel unit 6 may have at least one and, in particular, several track rollers 21. In particular, the track rollers 21 are configured to support the crawler track 22 relative to the underlying ground 8. For this purpose, the track rollers 21 are preferably rotatable about a respective track roller axis R3. The track roller axis R3 is preferably parallel to the drive wheel axis R1 and/or to the guide wheel axis R2 and/or to the swing axis P. It is also preferably perpendicular to the lifting axis H and/or to the steering axis K. Preferably, the distance of at least one and in particular all track roller axes R3 to the lifting axis H and/or to the steering axis K also changes due to the translational movement of the travel unit 6.

Figure 17:
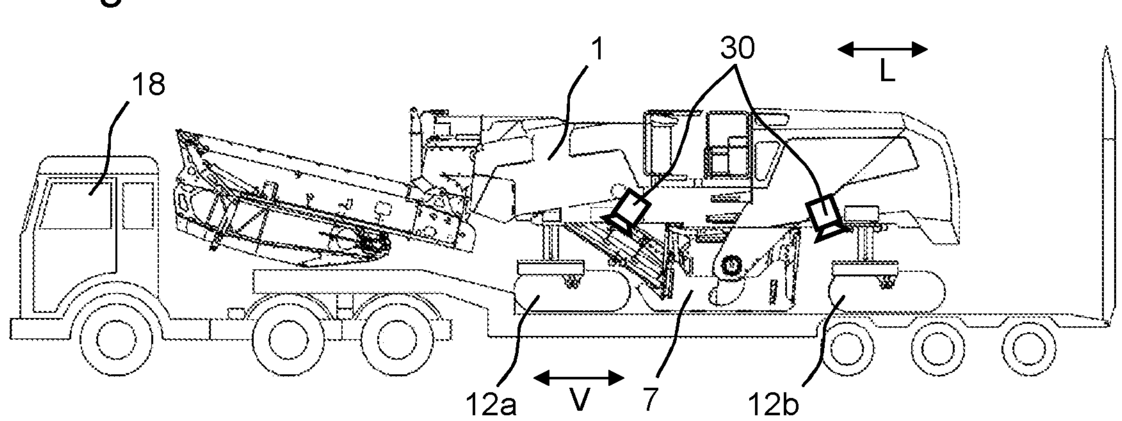
FIG. 17 is a side view of a ground milling machine loaded onto a transport vehicle with translationally moved travel units.
Figure 18:
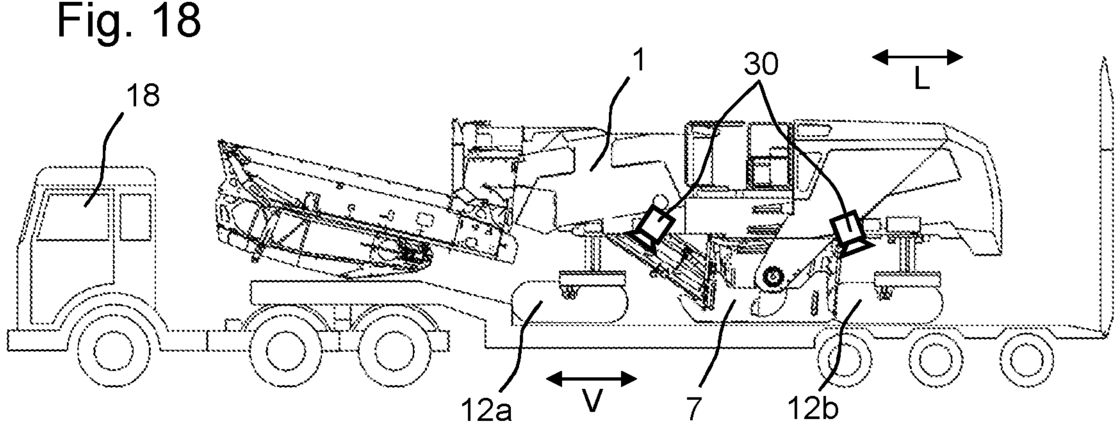
FIG. 18 is a side view of a ground milling machine loaded onto a transport vehicle with travel units moved in an opposite direction to that shown in FIG. 17.

FIGS. 17 and 18 illustrate the use case of the invention for positioning the ground milling machine 1 on a transport vehicle 18, for example a low-bed trailer. In particular, the ground milling machine 1 is already arranged on the loading area of the transport vehicle 18 and has been moved onto the loading area to such an extent that the front travel mechanism units 12*a* abut a step or bump or similar obstacle on the loading area of the transport vehicle 18 or are located at least just in front of it. The ground milling machine 1 therefore cannot be driven further onto the loading area of the transport vehicle 18 by a traction drive unit of the travel units 6. FIGS. 17 and 18 show situations in which the ground milling machine 1 or the machine body or machine frame 3 of the ground milling machine 1 was displaced by a translational movement of the travel units 6 during a standstill of the travel units 6 on the loading area of the transport vehicle 18. For example, the machine frame 3 of the ground milling machine 1 in FIG. 17 has been moved forward to a maximum extent in the longitudinal machine direction L (corresponding to a translational movement of the travel units 6 backward along the longitudinal direction machine L), whereby the available space directly behind the driver's cab of the transport vehicle 18 is optimally utilized, while additional space is made available at the rear end of the loading area of the transport vehicle for, for example, further objects to be transported. In FIG. 18, for example, the machine frame 3 of the ground milling machine 1 has been moved backward to a maximum extent in the longitudinal machine direction L (corresponding to a translational movement of the travel units 6 forward along the longitudinal machine direction L), providing additional space immediately behind the driver's cab of the transport vehicle 18 and making optimum use of the available free space at the rear end of the loading area of the transport vehicle 18.

Furthermore, it is also apparent from FIGS. 17 and 18 that additional space can be made available in front of and/or behind the milling drum box 7 in the longitudinal machine direction L by means of a translational movement of the travel units 6. For example, the travel units 6 of the rear travel mechanism units 12*b* in FIG. 17 are shifted backward in the longitudinal machine direction L such that more space is available directly behind the milling drum box 7. In FIG. 18, for example, the travel units 6 of the front travel mechanism units 12*a* are shifted forward in the longitudinal machine direction L such that more space is available directly in front of the milling drum box 7. Of course, it is also possible to move the travel units 6 of the front and rear travel mechanism units 12*a*, 12*b* such that more space is available in front of and behind the milling drum box 7 at the same time. This space can be used, for example, for maintenance works on the milling drum box 7, the milling drum 9 and/or the conveyor 5.

FIGS. 17 and 18 further show an optional supplement or replacement for the position sensor 17. Specifically, the ground milling machine 1 preferably has cameras 30 that film the travel units 6 and make the corresponding image material available in particular to the control device 27. From the image data of the cameras 30, the position of the travel units 6 relative to the lifting axis H and/or the steering axis K can be determined. This can be done computationally by the control device 27, for example, or by the operator viewing the image data, for example, via the control device 27 or a display device comprised by it.

Figure 19:
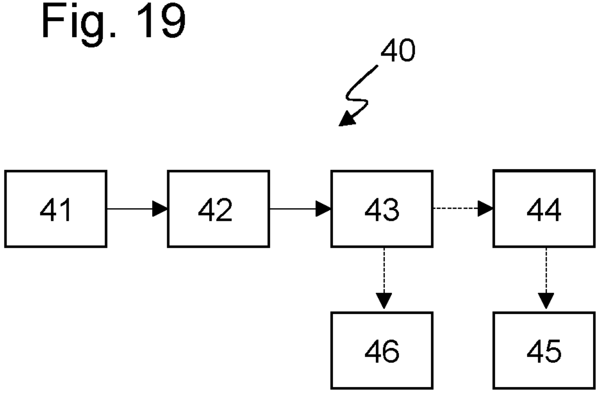
FIG. 19 is a flowchart of a method for moving a ground milling machine.

FIG. 19 shows a flowchart of a method 40 for moving a ground milling machine 1 in a direction up to 90° transverse to a longitudinal machine direction L. The method 40 preferably comprises rotating 41 the travel units 6 by up to 90° with respect to a longitudinal machine direction L. Simultaneously with said rotating 41 or also beforehand, translationally moving 42 the travel units 6 relative to the lifting axis H and/or the steering axis K preferably takes place in such a way that a collision of the travel units 6 with one another is prevented when setting a steering angle of up to 90°. For this purpose, the travel units 6 are preferably moved translationally such that they are moved away from the longitudinal machine center plane M in the case of a steering angle deviating from the straight-ahead position. In other words, the travel units 6 are preferably translationally moved outward from the machine center. Once the rotating 41 and moving 42 of the travel units 6 is complete, the ground milling machine 1 may be moved, for example, with a steering angle of up to 90° with respect to the longitudinal machine direction L. This is followed by moving 43 the ground milling machine 1 with the travel units 6 rotated and moved in accordance with the foregoing discussion. This significantly increases the mobility of the machine in the field.

Figure 20:
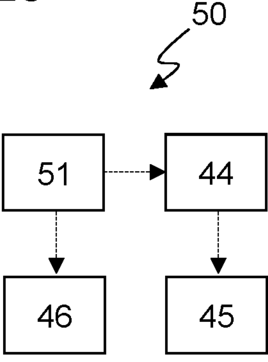
FIG. 20 is a flowchart of a method for positioning a ground milling machine for maintenance works and/or transport.

Finally, FIG. 20 shows a flowchart of a method 50 for positioning a ground milling machine 1 for maintenance works and/or transport. The method 50 preferably comprises translationally moving 51 all front and/or rear travel units 6 of the ground milling machine 1 in a same direction, respectively. In order to provide more space around the milling drum box 7 for maintenance works, for example, the front travel units 6 may be translationally moved forward along the longitudinal machine direction L and/or the rear travel units 6 may be translationally moved backward along the longitudinal machine direction L. On the other hand, in order to move the machine frame 3 of the ground milling machine 1 in the longitudinal machine direction L when the travel units 6 are stationary relative to the underlying ground 8 or the loading surface of a transport vehicle 18, all travel units 6 of the ground milling machine 1 are preferably translationally moved in a same direction along the longitudinal machine direction L. With the travel units 6 stationary relative to the underlying ground 8 or the loading surface of a transport vehicle 18, this movement means in particular, since it occurs relative to the lifting axis H and/or steering axis K, that the machine frame 3 of the ground milling machine 1 moves relative to the travel units 6.

For example, the methods 40, 50 may be automatically executed by the control device 27 following a corresponding control command from an operator. Optionally, the methods 40, 50 may also comprise monitoring 44 the position of the travel unit 6 relative to the lifting axis H and/or the steering axis K. For this purpose, the ground milling machine 1 preferably has a position sensor 17 or a camera 30. The position of the travel unit 6 relative to the lifting axis H and/or the steering axis K may furthermore be made known to the operator by indicating 45 by the control device 27. For this purpose, the control device 27 may be connected to a display device, such as a screen or display, for example. The control device 27 may also take safety measures to prevent or reduce hazards in the operation of the ground milling machine 1, in particular in the case of translationally moved travel units 6. For example, limiting 46 the maximum travel speed of the ground milling machine 1 may be comprised when the travel units 6 are moved translationally and thus have been moved relative to the lifting axis H and/or the steering axis K. The translational movement of the travel units 6 may result in the weight force of the ground milling machine 1 no longer acting optimally on the travel units 6 and also no longer being optimally transferred by them to the underlying ground 8. For this reason, it may be advantageous for safety reasons not to allow excessively fast travel speeds in the case of translationally moved travel units 6.

Figure 23:
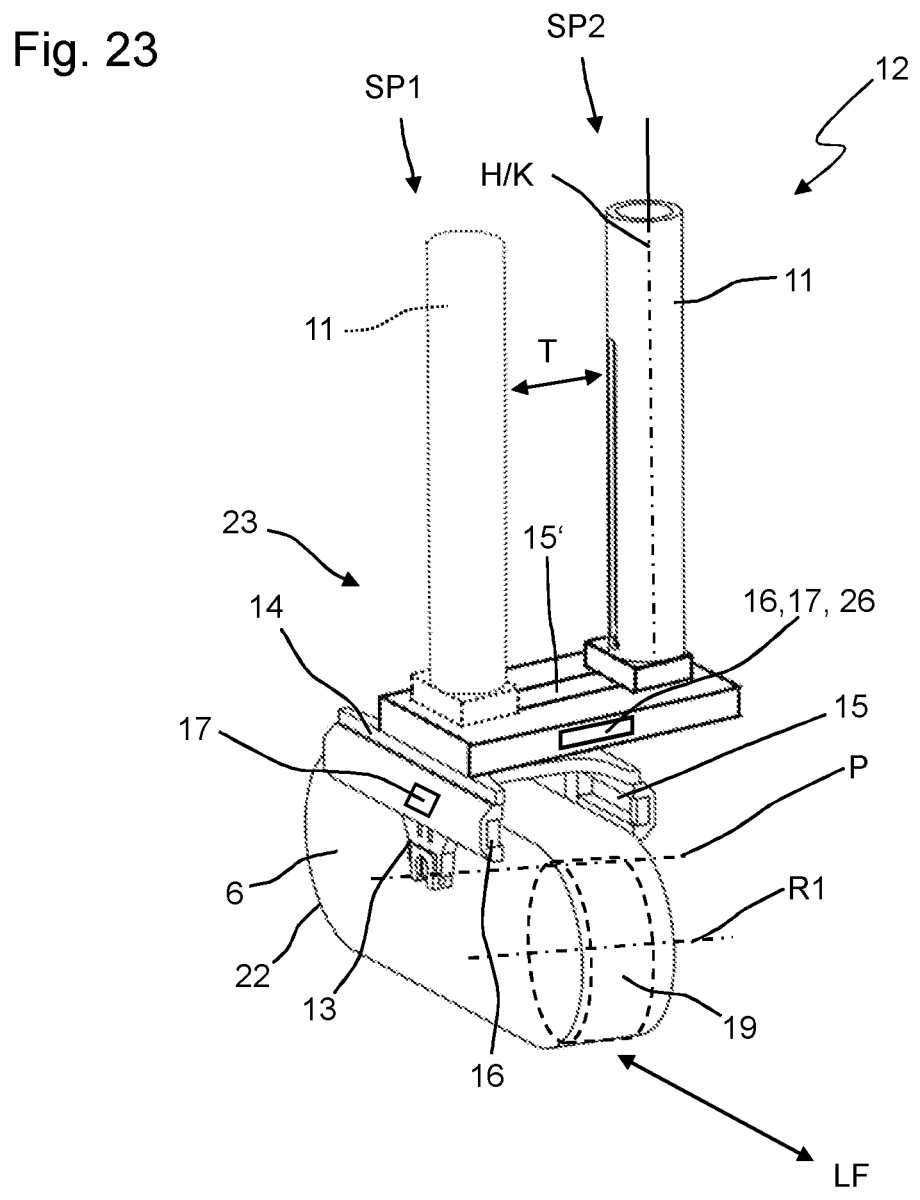

FIGS. 21, 22 and 23 illustrate another alternative approach to implementing the invention, which, however, may also be combined with the structural and functional principles shown in the preceding figures. An essential aspect of the alternative embodiments shown in FIGS. 21 to 23 is that the tread width SP of the ground milling machine can be varied there with the aid of the translational adjustment of one or more of the travel units 6 as described above. The figures refer to the descriptions and explanations of the preceding figures, so that mainly the differences will be discussed below.

In FIG. 21, the ground milling machine has a tread width SP1. The tread width is defined by the distance between the travel tracks of the travel units 6 transverse to the direction of travel of the travel units 6. In FIG. 22, on the other hand, the travel units 6 are each translationally adjusted outward transverse to the current direction of travel relative to the respective lifting and steering axes H/K. The travel units 6 positioned on the right side of the ground milling machine 1 as viewed in the direction of travel are thus offset to the right, while the travel units 6 positioned on the left side of the ground milling machine 1 are offset to the left. In the present embodiment example, the offset toward the respective outer side in fact has such an extent that the travel units 6 are located externally next to the ground milling machine 1 when the ground milling machine 1 is projected into a horizontal reference plane. This increases the tread width SP of the ground milling machine 1 from the tread width SP1 shown in FIG. 21 to the tread width SP2 shown in FIG. 22.

FIG. 23 illustrates a possible embodiment of a mounting of the travel unit 6 on a lifting device 11 in an oblique perspective view, wherein the lifting column 11 is shown with solid lines in a position corresponding to FIG. 22 and in dotted phantom lines in a position corresponding to FIG. 21. In this embodiment, the mounting device 23 is thus configured such that the travel unit 6 is translationally adjustable, in particular displaceable, in the horizontal plane transverse to its running direction LF relative to the steering and/or lifting axis H/K. A suitable guide device, such as a guide rail 15', may be provided for this purpose. A drive device 26 and/or a position sensor 17, a stop 16, etc. may also be provided for this transverse adjustment in the direction T.

FIG. 23 illustrates that several of the mounting devices may also be functionally arranged in series between the respective travel unit 6 and the respective lifting column 11 and in this way enable, for example, as shown in FIG. 23, a translational adjustment of the respective travel unit 6 relative to the lifting column 11 and/or to the lifting and/or steering axis H/K in the horizontal plane in the direction of the running direction LF and perpendicular thereto. Based on this, it is also possible to superimpose translational adjustments via both mounting devices.

Overall, the translational movement of the travel unit 6 or the travel units 6 according to the invention significantly increases the flexibility of use of the ground milling machine 1. In particular, their mobility and transportability is improved.

What is claimed is:

1. A ground milling machine, comprising:

a machine frame and at least one front travel unit as viewed in a longitudinal machine direction and at least one rear travel unit as viewed in the longitudinal machine direction;

each travel unit of the at least one front and the at least one rear travel units comprising a respective travel wheel, which is in contact with an underlying ground during travel operation of the ground milling machine and has a wheel tread configured for direct ground contact, or a crawler track, which is in contact with an underlying ground during travel operation of the ground milling machine, and a drive wheel configured for driving the crawler track;

at least one travel unit of the at least one front and the at least one rear travel units being height-adjustable along a lifting axis via a lifting device and/or being rotatable about a steering axis for steering the ground milling machine; and the at least one travel unit of the at least one front and the at least one rear travel units being arranged on the machine frame via a mounting device, wherein the mounting device is configured such that the at least one travel unit of the at least one front and the at least one rear travel units is movable at least partially transversely to the lifting axis and/or the steering axis through a translational movement.

2. The ground milling machine according to claim 1, wherein:

the drive wheel is rotatable about a drive wheel axis; or the travel wheel is rotatable about a travel wheel axis; and/or the mounting device is configured such that the at least one travel unit of the at least one front and the at least one rear travel units is tiltable about a swing axis; and the mounting device is configured such that a distance between the drive wheel axis or the travel wheel axis and/or the swing axis is adjustable relative to the lifting axis and/or the steering axis.

3. The ground milling machine according to claim 2, wherein the at least one travel unit of the at least one front and the at least one rear travel units further comprises at least one guide wheel, the at least one guide wheel being rotatable about a guide wheel axis, and the mounting device is configured such that a distance of the guide wheel axis is adjustable relative to the lifting axis and/or the steering axis.

4. The ground milling machine according to claim 1, wherein the mounting device has a track bracket attached to the lifting device or the machine frame and a track support attached to the at least one travel unit of the at least one front and the at least one rear travel units, the track bracket and the track support being mounted movably on one another such that the track bracket and the track support are translationally adjustable relative to one another.

5. The ground milling machine according to claim 4, wherein the mounting device comprises a guide rail, wherein the track bracket and the track support are positively connected to each other via the guide rail, wherein the track bracket and the track support are movable relative to each other along the guide rail.

6. The ground milling machine according to claim 1, wherein the mounting device comprises a locking device, the locking device being adjustable between a locking position and a release position, and in that the locking device prevents the translational movement of the at least one travel unit of the at least one front and the at least one rear travel units relative to the lifting axis and/or the steering axis in the locking position and allows the translational movement in the release position.

7. The ground milling machine according to claim 1, wherein the mounting device comprises a drive device which drives the translational movement of the at least one travel unit of the at least one front and the at least one rear travel units relative to the lifting axis and/or the steering axis.

8. The ground milling machine according to claim 1, wherein the mounting device comprises at least one stop which specifies an end position for the translational movement of the at least one travel unit of the at least one front and the at least one rear travel units relative to the lifting axis and/or the steering axis.

9. The ground milling machine according to claim 1, further comprising a position sensor and/or a camera, which determines a position of the at least one travel unit of the at least one front and the at least one rear travel units relative to the lifting axis and/or relative to the steering axis and/or relative to the mounting device.

10. The ground milling machine according to claim 1, wherein the at least one front travel unit further comprises two front travel units and/or the at least one rear travel unit further comprise two rear travel units, the two front travel units and/or the two rear travel units each comprising a lifting device with a lifting axis and/or a steering axis and a mounting device, the mounting device being configured such that a respective travel unit of the two front and/or the two rear travel units is moveable relative to a respective lifting axis and/or steering axis through a translational movement.

11. A method for positioning the ground milling machine according to claim 1, for maintenance works and/or transport, wherein the at least one front travel unit further comprises two front travel units and/or the at least one rear travel unit further comprises two rear travel units, each of the travel units comprising a lifting device with a lifting axis and/or a steering axis, the method comprising:

translationally moving the two front travel units and/or the two rear travel units relative to the respective lifting axis and/or steering axis and transversely to the respective lifting axis and/or steering axis, wherein the two front travel units are moved in a same direction along the longitudinal machine direction and/or wherein the two rear travel units are moved in a same direction along the longitudinal machine direction.

12. The ground milling machine according to claim 1, wherein the ground milling machine is a road milling machine or stabilizer or recycler.

13. The ground milling machine according to claim 3, wherein the at least one travel unit of the at least one front and the at least one rear travel units further comprises at least one track roller, the at least one track roller being rotatable about a track roller axis, and the mounting device is configured such that a distance of the track roller axis is adjustable relative to the lifting axis and/or the steering axis.

14. The ground milling machine according to claim 4, further comprising the track bracket and the track support being mounted movably on one another such that the track bracket and the track support are linearly adjustable relative to one another.

15. The ground milling machine according to claim 7, wherein the drive device further comprises a hydraulic cylinder.

16. The ground milling machine according to claim 8, wherein the at least one stop further comprises at least two stops which specify two mutually opposite end positions on the mounting device.

17. The ground milling machine according to claim 9, wherein the position sensor and/or the camera forwards the position of the at least one travel unit of the at least one front and the at least one rear travel units relative to the lifting axis and/or relative to the steering axis and/or relative to the mounting device to a control device.

18. The method of claim 11, wherein the two front travel units are moved relative to the two rear travel units in a same or another direction along the longitudinal machine direction.

19. A method for moving the ground milling machine according to claim 1, in a direction up to 90° transverse to the longitudinal machine direction, the ground milling machine having the at least one travel unit of the at least one front and the at least one rear travel units mounted on the machine frame for rotation about the steering axis, the method comprising the steps of:

rotating the at least one travel unit of the at least one front and the at least one rear travel units about the steering axis by up to 90° transversely to the longitudinal machine direction, the at least one travel unit of the at least one front and the at least one rear travel units comprising a crawler track configured for direct ground contact and a drive wheel configured to drive the crawler track or a travel wheel with a wheel tread configured for direct ground contact;

translationally moving the at least one travel unit of the at least one front and the at least one rear travel units relative to the steering axis;

moving the ground milling machine with the at least one travel unit of the at least one front and the at least one rear travel units.

20. The method according to claim 19, further comprising at least one of the following:

performing the steps automatically by a control device;

monitoring of a position of the at least one travel unit of the at least one front and the at least one rear travel units relative to the lifting axis and/or the steering axis is performed by a position sensor and/or by at least one camera;

displaying of the position of the at least one travel unit of the at least one front and the at least one rear travel units relative to the lifting axis and/or the steering axis is performed by the control device;

limiting of a maximum travel speed of the ground milling machine is performed in a case of translational movement of the at least one travel unit of the one front travel and the at least one rear travel units relative to the respective lifting axis and/or steering axis.

21. The method of claim 20, wherein performing the steps automatically by the control device is in response to a control command entered into the control device by an operator.

* * * * *